(12) United States Patent  
Cha et al.

(10) Patent No.: US 12,108,349 B2
(45) Date of Patent: Oct. 1, 2024

(54) METHOD AND USER EQUIPMENT FOR RECEIVING POSITIONING REFERENCE SIGNAL, AND BASE STATION FOR TRANSMITTING POSITIONING REFERENCE SIGNAL

(71) Applicant: LG ELECTRONICS INC., Seoul (KR)

(72) Inventors: Hyunsu Cha, Seoul (KR); Sukhyon Yoon, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 17/593,930

(22) PCT Filed: Apr. 3, 2020

(86) PCT No.: PCT/KR2020/004545
  § 371 (c)(1),
  (2) Date: Sep. 28, 2021

(87) PCT Pub. No.: WO2020/204646
  PCT Pub. Date: Oct. 8, 2020

(65) Prior Publication Data
  US 2022/0174620 A1    Jun. 2, 2022

Related U.S. Application Data

(60) Provisional application No. 62/828,471, filed on Apr. 3, 2019.

(51) Int. Cl.
  *H04W 56/00*   (2009.01)
  *H04L 5/00*    (2006.01)
  (Continued)

(52) U.S. Cl.
  CPC ......... *H04W 56/001* (2013.01); *H04L 5/0051* (2013.01); *H04W 16/28* (2013.01); *H04W 24/10* (2013.01); *H04W 56/006* (2013.01)

(58) Field of Classification Search
  None
  See application file for complete search history.

(56) References Cited

U.S. PATENT DOCUMENTS

| 2022/0116089 A1* | 4/2022 | Khoryaev | ............... H04B 7/043 |
| 2022/0167301 A1* | 5/2022 | Goyal | .................... G01S 5/0236 |

FOREIGN PATENT DOCUMENTS

WO    2018128410    7/2018

OTHER PUBLICATIONS

PCT International Application No. PCT/KR2020/004545, International Search Report dated Jul. 23, 2020, 16 pages.
(Continued)

*Primary Examiner* — Saad Khawar
(74) *Attorney, Agent, or Firm* — LEE, HONG, DEGERMAN, KANG & WAIMEY

(57) ABSTRACT

According to at least one embodiment, a UE may perform measurements based on a plurality of synchronization signal blocks (SSBs), transmit first request information related to positioning reference signal (PRS) transmissions based on the measurements, receive a positioning related configuration, and receive at least one PRS based on the positioning related configuration, wherein the first request information includes information regarding a first SSB, and the positioning related configuration includes information related to a reference PRS resource for a reference timing for a reference signal time difference (RSTD), and the reference PRS resource is a PRS resource related to a same downlink beam as that for the first SSB.

10 Claims, 36 Drawing Sheets

(51) Int. Cl.
*H04W 16/28* (2009.01)
*H04W 24/10* (2009.01)

(56) References Cited

OTHER PUBLICATIONS

Huawei et al., "Considerations on OTDOA in NR," R2-1904100, 3GPP TSG-RAN WG2 Meeting #105bis, Apr. 2019, 3 pages.
Fraunhofer Iis et al., "NR beam management supporting multi-gNB measurements for positioning," R1-1813583, 3GPP TSG RAN WG1 Meeting #95, Nov. 2018, 10 pages.
LG Electronics, "Discussions on DL only based Positioning, " R1-1900629, 3GPP TSG RAN WG1 Ad-Hoc Meeting 1901, Jan. 2019, 11 pages.
Intel Corporation, "Summary for NR-Positioning AI—7.2.10.1.1 DL only Based Positioning," R1-1903394, 3GPP TSG RAN WG1 Meeting #96, Mar. 2019, 23 pages.

\* cited by examiner (a)

(b)

METHOD AND USER EQUIPMENT FOR RECEIVING POSITIONING REFERENCE SIGNAL, AND BASE STATION FOR TRANSMITTING POSITIONING REFERENCE SIGNAL

CROSS-REFERENCE TO RELATED APPLICATIONS

This application is the National Stage filing under 35 U.S.C. 371 of International Application No. PCT/KR2020/004545, filed on Apr. 3, 2020, which claims the benefit of U.S. Provisional Application No. 62/828,471, filed on Apr. 3, 2019, the contents of which is hereby incorporated by reference herein in its entirety.

TECHNICAL FIELD

Various embodiments of the present disclosure relate to a wireless communication system, and more particularly, to a method of transmitting and receiving a signal in a wireless communication system and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

Various embodiments of the present disclosure may provide a method and apparatus for transmitting and receiving a signal in a wireless communication system.

For example, various embodiments of the present disclosure may provide a positioning method in a wireless communication system and an apparatus supporting the same.

For example, various embodiments of the present disclosure relate to beam-related positioning enhancement. For example, various embodiments of the present disclosure may provide a positioning method for enabling more effective user equipment (UE) positioning based on a transmission/reception beam in a wireless communication system and an apparatus supporting the same.

For example, various embodiments of the present disclosure may provide a positioning method for enabling more effective UE positioning by determining a positioning reference signal (PRS) resource based on the quality of a synchronization signal block (SSB)-related and/or channel state information-reference signal (CSI-RS)-related measurement result in a wireless communication system and an apparatus supporting the same.

For example, various embodiments of the present disclosure may provide a positioning method for enabling more effective UE positioning by determining a reference timing for reference signal time difference (RSTD) calculation based on the quality of an SSB-related and/or CSI-RS-related measurement result in a wireless communication system and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal in a wireless communication system and an apparatus supporting the same.

According to various embodiments of the present disclosure, a method of a user equipment (UE) in a wireless communication system may be provided.

In an exemplary embodiment, the method may include: receiving a plurality of synchronization signal blocks (SSBs); transmitting information related to measurements based on the plurality of SSBs; and receiving a first positioning reference signal (PRS).

In an exemplary embodiment, the plurality of SSBs may be received based on a plurality of beams directed in different directions.

In an exemplary embodiment, the first PRS may be received based on a beam directed in the same direction as a beam in which one of the plurality of SSBs has been received.

In an exemplary embodiment, the one SSB may be determined based on a predetermined condition related to the measurements from among the plurality of SSBs.

In an exemplary embodiment, the information related to the measurements may include: (i) information regarding the direction of the beam in which the one SSB is received; and (ii) first request information requesting transmission of the PRS based on the beam directed in the same direction as the beam in which the one SSB is received.

In an exemplary embodiment, the first PRS may be received based on the beam directed in the same direction as the beam in which the one SSB is received in response to the information related to the measurements.

In an exemplary embodiment, the first request information may be related to requesting a change of an index of an SSB configured with quasi-colocation (QCL) type-D with the first PRS.

In an exemplary embodiment, the one SSB may be determined to be an SSB with the changed index.

In an exemplary embodiment, the predetermined condition related to the measurements may include: (i) a first condition related to having a minimum of propagation times measured in the plurality of respective SSBs; (ii) a second condition related to having a minimum of time of arrivals (ToAs) measured in the plurality of respective SSBs; (iii) a third condition related to having a minimum of time of flights (ToFs) measured in the plurality of respective SSBs; and (iv) a fourth condition related to having a maximum of time of reference signal reception powers (RSRPs) measured in the plurality of respective SSBs.

In an exemplary embodiment, the one SSB may satisfy at least one of the first condition, the second condition, the third condition, or the fourth condition.

In an exemplary embodiment, the method may further include: receiving reference configuration information related to a reference timing for at least one reference signal time difference (RSTD); receiving at least one second PRS; and transmitting information related to the at least one RSTD based on the reference timing, the first PRS, and the at least one second PRS.

In an exemplary embodiment, the reference configuration information may include information related to a reference PRS resource for the reference timing.

In an exemplary embodiment, the reference PRS resource may be configured as one of a first PRS resource related to the first PRS and at least one second PRS related to the at least one second PRS.

In an exemplary embodiment, the reference PRS may be configured in the first PRS resource in response to second request information requesting configuration of, as the reference PRS resource, the first PRS resource related to the first PRS received based on the beam directed in the same direction as the beam in which the one SSB has been received among the plurality of SSBs.

In an exemplary embodiment, the first PRS and the at least one second PRS may be received from a plurality of transmission points (TPs).

In an exemplary embodiment, the reference configuration information may further include information related to a reference TP for the reference timing among the plurality of TPs.

According to various embodiments of the present disclosure, an apparatus in a wireless communication system may be provided.

In an exemplary embodiment, the apparatus may include: a memory; and at least one processor coupled to the memory, In an exemplary embodiment, the at least one processor may be configured to: receive a plurality of synchronization signal blocks (SSBs), transmit information related to measurements based on the plurality of SSBs, and receive a first positioning reference signal (PRS).

In an exemplary embodiment, the plurality of SSBs may be received based on a plurality of beams directed in different directions.

In an exemplary embodiment, the first PRS may be received based on a beam directed in the same direction as a beam in which one of the plurality of SSBs has been received.

In an exemplary embodiment, the one SSB may be determined based on a predetermined condition related to the measurements from among the plurality of SSBs.

In an exemplary embodiment, the information related to the measurements may include: (i) information regarding the direction of the beam in which the one SSB has been received; and (ii) first request information requesting transmission of the PRS based on the beam directed in the same direction as the beam in which the one SSB is received.

In an exemplary embodiment, the first PRS may be received based on the beam directed in the same direction as the beam in which the one SSB is received in response to the information related to the measurements.

In an exemplary embodiment, the predetermined condition related to the measurements may include: (i) a first condition related to having a minimum of propagation times measured in the plurality of respective SSBs; (ii) a second condition related to having a minimum of time of arrivals (ToAs) measured in the plurality of respective SSBs; (iii) a third condition related to having a minimum of time of flights (ToFs) measured in the plurality of respective SSBs; and (iv) a fourth condition related to having a maximum of time of reference signal reception powers (RSRPs) measured in the plurality of respective SSBs.

In an exemplary embodiment, the one SSB may satisfy at least one of the first condition, the second condition, the third condition, or the fourth condition.

In an exemplary embodiment, the at least one processor may be further configured to: receive reference configuration information related to a reference timing for at least one reference signal time difference (RSTD), receive at least one second PRS, and transmit information related to the at least one RSTD based on the reference timing, the first PRS, and the at least one second PRS.

In an exemplary embodiment, the reference configuration information may include information related to a reference PRS resource for the reference timing.

In an exemplary embodiment, the reference PRS resource may be configured as one of a first PRS resource related to the first PRS and at least one second PRS related to the at least one second PRS.

In an exemplary embodiment, the reference PRS may be configured in the first PRS resource in response to second request information requesting configuration of, as the reference PRS resource, the first PRS resource related to the first PRS received based on the beam directed in the same direction as the beam in which the one SSB has been received among the plurality of SSBs.

In an exemplary embodiment, the apparatus may communicate with at least one of a user equipment (UE), a network, or an autonomous driving vehicle other than a vehicle including the apparatus.

According to various embodiments of the present disclosure, a method of a UE in a wireless communication system may be provided.

In an exemplary embodiment, the method may include: receiving a plurality of channel state information-reference signals (CSI-RSs); transmitting information related to measurements based on the plurality of CSI-RSs; and receiving a first positioning reference signal (PRS).

In an exemplary embodiment, the plurality of CSI-RSs may be received based on a plurality of beams directed in different directions.

In an exemplary embodiment, the first PRS may be received based on a beam directed in the same direction as a beam in which one of the plurality of CSI-RSs has been received.

In an exemplary embodiment, the one CSI-RS may be determined based on a predetermined condition related to the measurements from among the plurality of CSI-RSs.

According to various embodiments of the present disclosure, an apparatus in a wireless communication system may be provided.

In an exemplary embodiment, the apparatus may include: a memory; and at least one processor coupled to the memory.

In an exemplary embodiment, the at least one processor is configured to: receive a plurality of channel state information-reference signals (CSI-RSs); transmit information related to measurements based on the plurality of CSI-RSs; and receive a first positioning reference signal (PRS).

In an exemplary embodiment, the plurality of CSI-RSs may be received based on a plurality of beams directed in different directions.

In an exemplary embodiment, the first PRS may be received based on a beam directed in the same direction as a beam in which one of the plurality of CSI-RSs has been received.

In an exemplary embodiment, the one CSI-RS may be determined based on a predetermined condition related to the measurements from among the plurality of CSI-RSs.

According to various embodiments of the present disclosure, an apparatus operating in a wireless communication system may be provided.

In an exemplary embodiment, the apparatus may include: at least one processor; and at least one memory storing at least one instruction causing the at least one processor to perform a method.

In an exemplary embodiment, the method may include: receiving a plurality of synchronization signal blocks (SSBs); transmitting information related to measurements based on the plurality of SSBs; and receiving a first positioning reference signal (PRS).

In an exemplary embodiment, the plurality of SSBs may be received based on a plurality of beams directed in different directions.

In an exemplary embodiment, the first PRS may be received based on a beam directed in the same direction as a beam in which one of the plurality of SSBs has been received.

In an exemplary embodiment, the one SSB may be determined based on a predetermined condition related to the measurements from among the plurality of SSBs.

According to various embodiments of the present disclosure, a processor-readable medium storing at least one instruction causing at least one processor to perform a method may be provided.

In an exemplary embodiment, the method may include: receiving a plurality of synchronization signal blocks (SSBs); transmitting information related to measurements based on the plurality of SSBs; and receiving a first positioning reference signal (PRS).

In an exemplary embodiment, the plurality of SSBs may be received based on a plurality of beams directed in different directions.

In an exemplary embodiment, the first PRS may be received based on a beam directed in the same direction as a beam in which one of the plurality of SSBs has been received.

In an exemplary embodiment, the one SSB may be determined based on a predetermined condition related to the measurements from among the plurality of SSBs.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

Advantageous Effects

According to various embodiments of the present disclosure, the following effects may be achieved.

According to various embodiments of the present disclosure, a method of transmitting and receiving a signal in a wireless communication system and an apparatus supporting the same may be provided.

For example, according to various embodiments of the present disclosure, a positioning method in a wireless communication system and an apparatus supporting the same may be provided.

For example, various embodiments of the present disclosure relate to beam-related positioning enhancement. For example, according to various embodiments of the present disclosure, a positioning method for enabling more effective user equipment (UE) positioning based on a transmission/reception beam in a wireless communication system and an apparatus supporting the same may be provided.

For example, according to various embodiments of the present disclosure, a positioning method for enabling more effective UE positioning by determining a positioning reference signal (PRS) resource based on the quality of a synchronization signal block (SSB)-related and/or channel state information-reference signal (CSI-RS)-related measurement result in a wireless communication system and an apparatus supporting the same may be provided.

For example, according to various embodiments of the present disclosure, a positioning method for enabling more effective UE positioning by determining a reference timing for reference signal time difference (RSTD) calculation based on the quality of an SSB-related and/or CSI-RS-related measurement result in a wireless communication system and an apparatus supporting the same may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

FIG. 9 is a diagram illustrating exemplary beamforming using an SSB and a channel state information-reference signal (CSI-RS), which is applicable to various embodiments of the present disclosure.

MODE FOR CARRYING OUT THE DISCLOSURE

Figure 1:
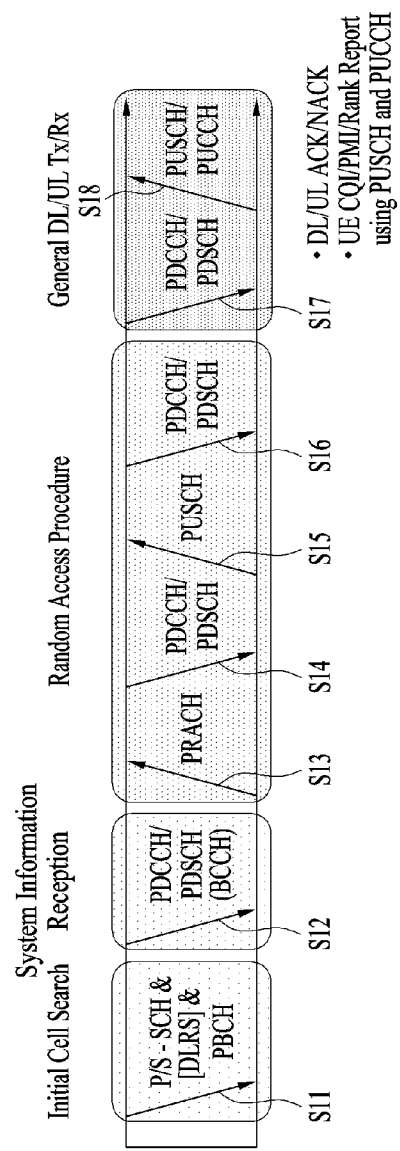
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided least it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the various embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a $3^{rd}$ generation partnership project (3GPP) system, a 3GPP long term evolution (LTE) system, a 3GPP $5^{th}$ generation (5G) new RAT (NR) system, or a 3GPP2 system. In particular, various embodiments of the present disclosure may be supported by standard specifications including 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and 3GPP TS 38.455. That is, steps or parts which are not described in various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure;

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be combined into one operation for a UE transmission, and steps S14 and S16 may be combined into one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
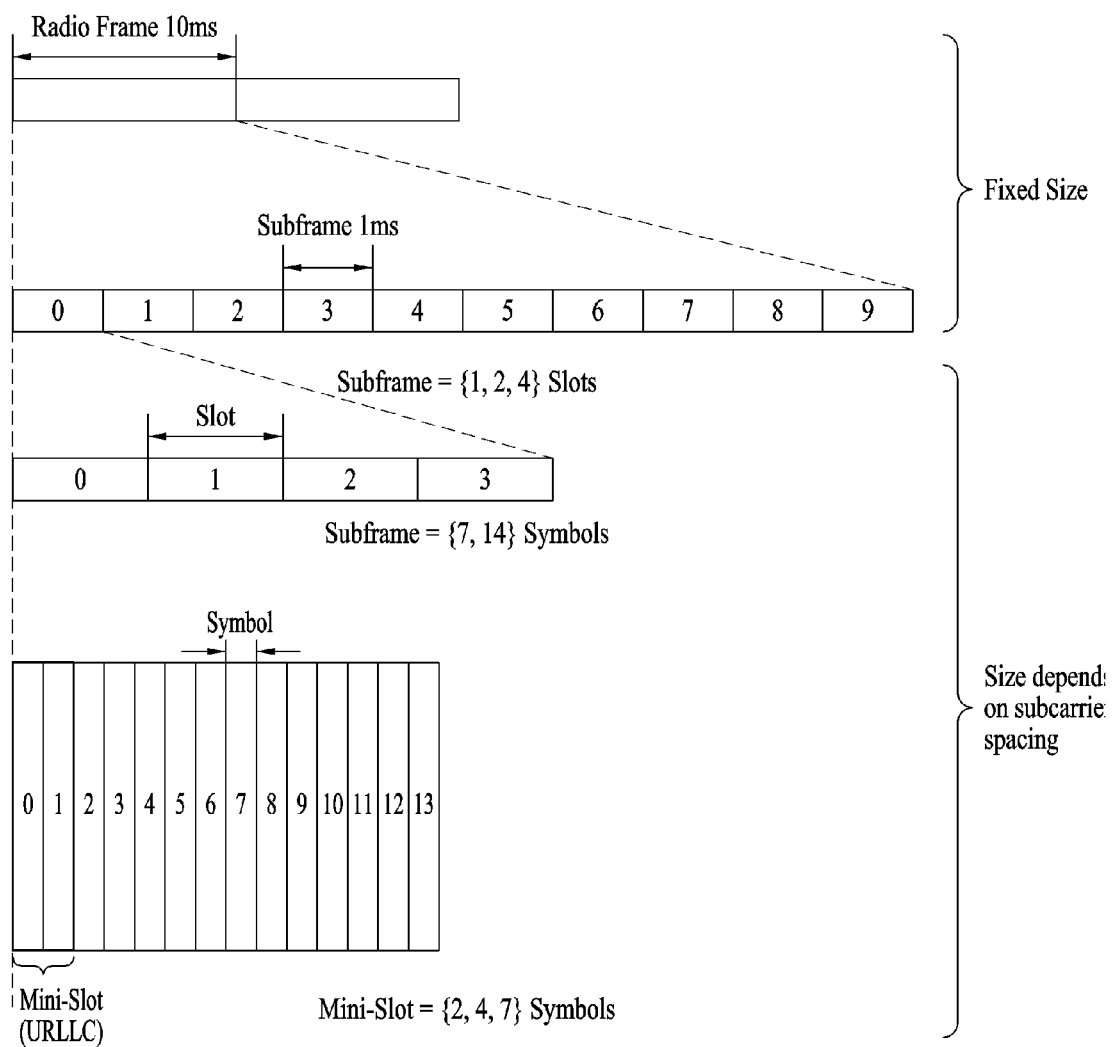
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^\mu \cdot$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz})*2048)$ are placed in the following relationship: $T_s/T_c = 64$. DL and UL transmissions are organized into (radio) frames each having a duration of $T_f = (\Delta f_{max} * N_f/100) * T_c = 10$ ms. Each radio frame includes 10 subframes each having a duration of $T_{sf} = (\Delta f_{max} * N_f/1000) * T_c = 1$ ms. There may exist one set of frames for UL and one set of frames for DL. For a numerology $\mu$, slots are numbered with $n^\mu_s \in \{0, \ldots, N^{slot,\mu}_{subframe} - 1\}$ in an increasing order in a subframe, and with $n^\mu_{s,f} \in \{0, \ldots, N^{slot,\mu}_{frame} - 1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
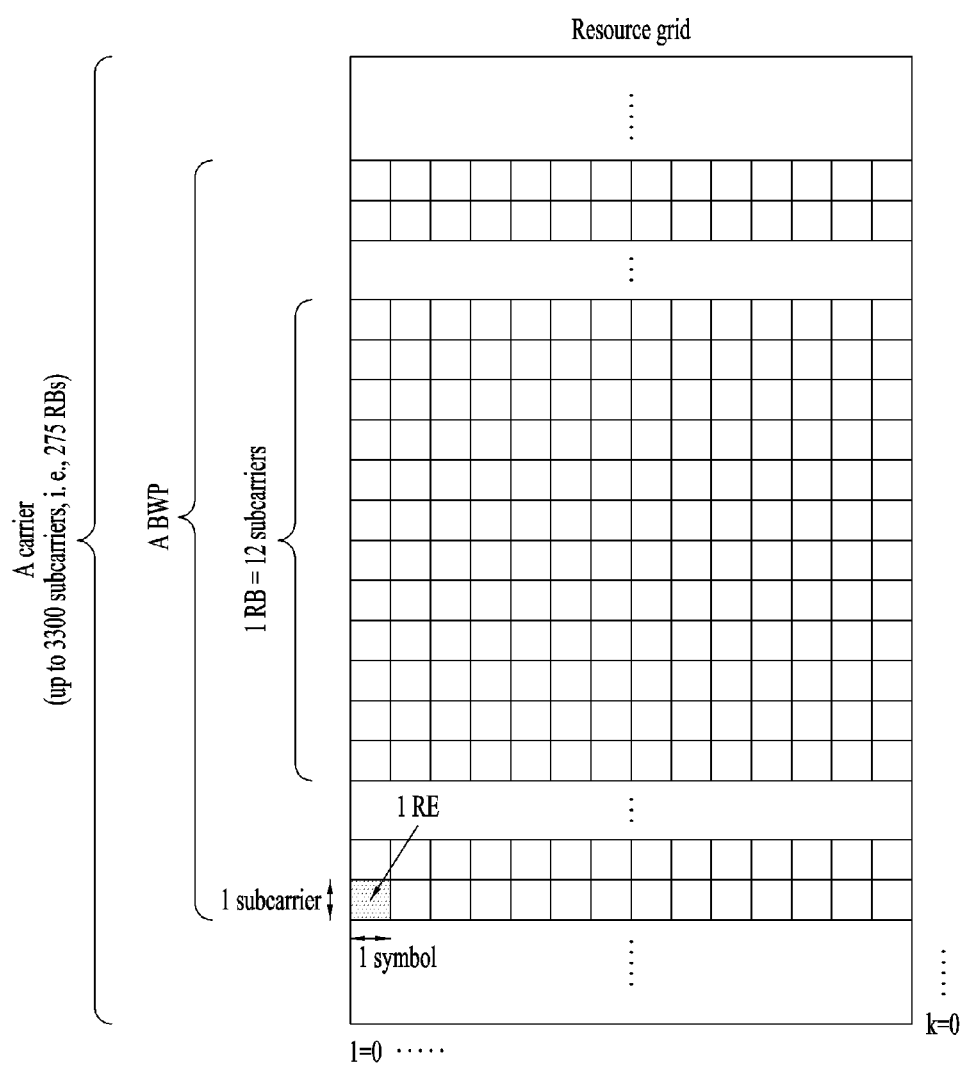
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
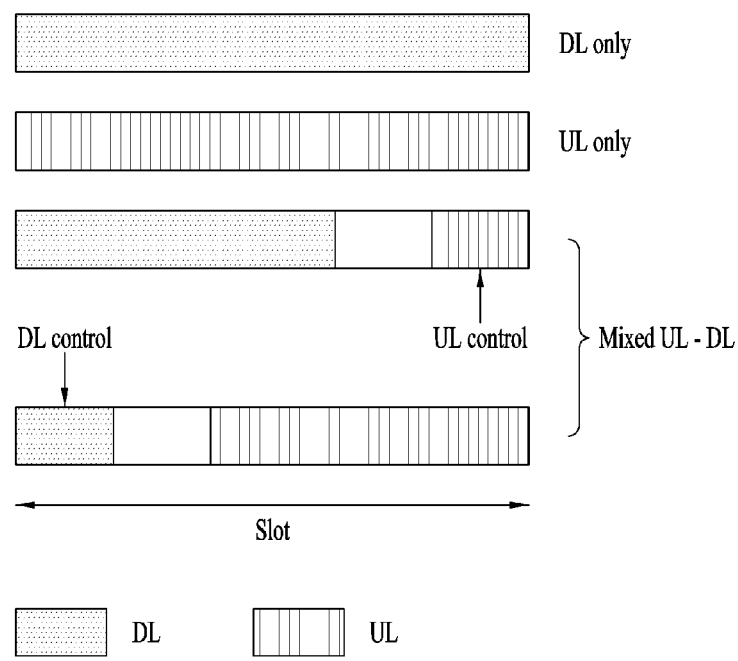
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
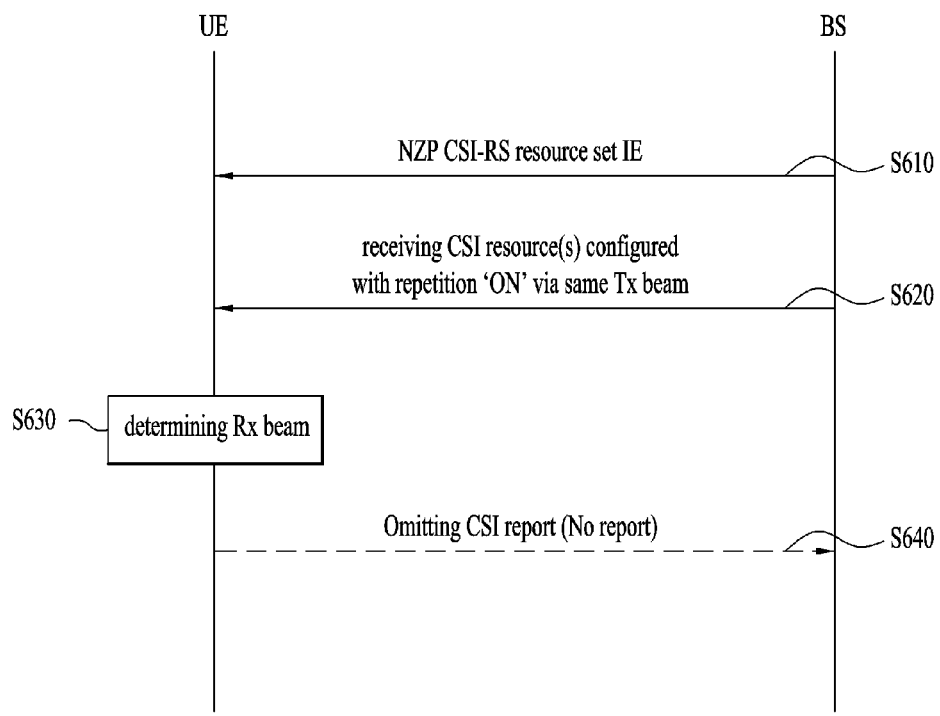
FIG. 12 is a flowchart illustrating an exemplary process of determining a reception beam by a user equipment (UE), which is applicable to various embodiments of the present disclosure.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (US S). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.
monitoringSlotPeriodicityAndOffset: A PDCCH monitoring periodicity (in slots) and a PDCCH monitoring offset (in slots).
monitoringSymbolsWithinSlot: A PDCCH monitoring pattern (e.g., the first symbol(s) in the CORESET) in a PDCCH monitoring slot.
nrofCandidates: The number of PDCCH candidates for each AL={1, 2, 4, 8, 16} (one of 0, 1, 2, 3, 4, 5, 6, and 8).

Table 5 lists exemplary features of the respective search space types.

and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 5

| Type | Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC comnands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0

TABLE 7

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell Search

Figure 5:
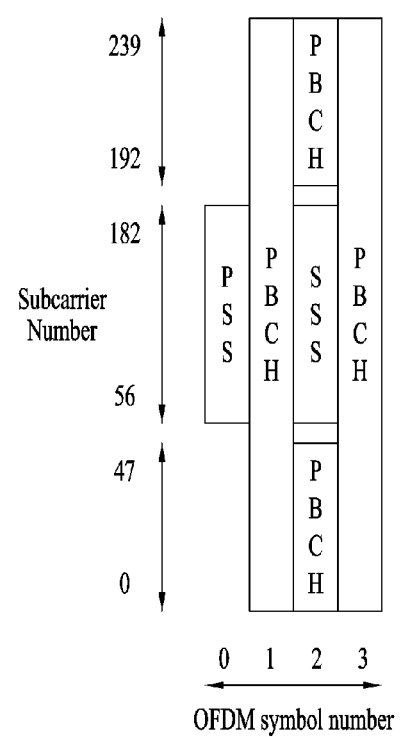
FIG. 5 is a diagram illustrating a synchronization signal block (SSB) structure to which various embodiments of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, and so on based on an SSB.

Referring to FIG. 5, the SSB includes a PSS, an SSS, and a PBCH. The SSB includes four consecutive OFDM symbols, and the PSS, the PBCH, the SSS/PBCH, and the PBCH are transmitted in the respective OFDM symbols. Each of the PSS and the SSS includes one OFDM symbol by 127 subcarriers, and the PBCH includes three OFDM symbols by 576 subcarriers. Polar coding and QPSK are applied to the PBCH. The PBCH includes data REs and demodulation reference signal (DMRS) REs in every OFDM symbol. There are three DMRS REs per RB, with three data REs between every two adjacent DMRS REs.

Cell search is a process of acquiring time/frequency synchronization with a cell and detecting the identifier (ID) (e.g., physical cell ID (PCID)) of the cell. The PSS is used to detect a cell ID in a cell ID group, and the SSS is used to detect the cell ID group. The PBCH is used to detect an SSB (time) index and a half-frame.

The cell search process of the UE may be summarized in Table 8.

TABLE 8

| | Type of Signals | Operations |
|---|---|---|
| 1$^{st}$ step | PSS | SS/PBCH block (SSB) symbol timing acquisition Cell ID detection within a cell ID group (3 hypothesis) |
| 2$^{nd}$ Step | SSS | Cell ID group detection (336 hypothesis) |
| 3$^{rd}$ Step | PBCH DMRS | SSB index and Half frame (HF) index (Slot and frame boundary detection) |
| 4$^{th}$ Step | PBCH | Time information (80 ms, System Frame Number (SFN), SSB index, HF) Remaining Minimum System Information |

TABLE 8-continued

| | Type of Signals | Operations |
|---|---|---|
| 5$^{th}$ Step | PDCCH and PDSCH | (RMSI) Control resource set (CORESET)/Search space configuration Cell access information. RACE configuration |

There may be 336 cell ID groups, each including three cell IDs. There may be 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
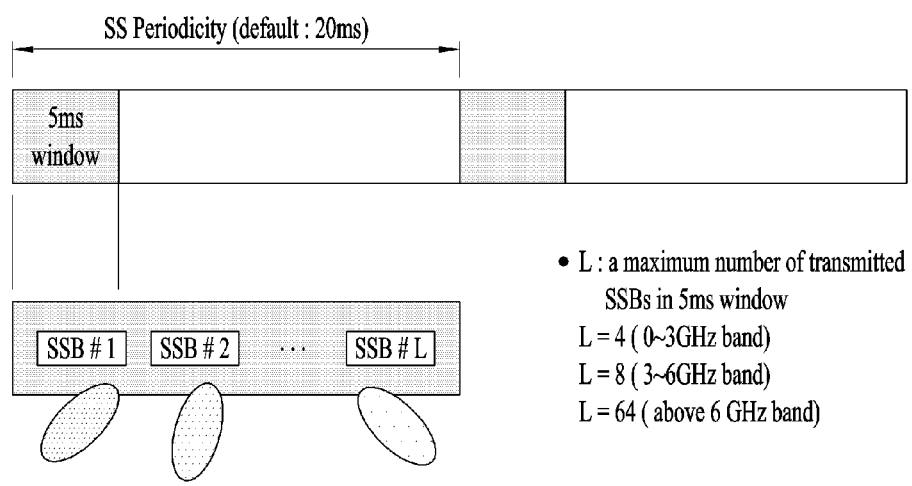
FIG. 6 is a diagram illustrating an exemplary SSB transmission method to which various embodiments of the present disclosure are applicable.

FIG. 6 is an exemplary SSB transmission method to which various embodiments of the present disclosure are applicable.

Referring to FIG. 6, an SSB is periodically transmitted according to an SSB periodicity. A basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured in a 5-ms time window (i.e., half-frame), and an SSB may be repeatedly transmitted up to L times within the SS burst set. The maximum number L of transmissions of the SSB may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L-1 in temporal order within the SSB burst set (i.e., half-frame).

Case A: 15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

1.5. Beam Alignment

Figure 7:
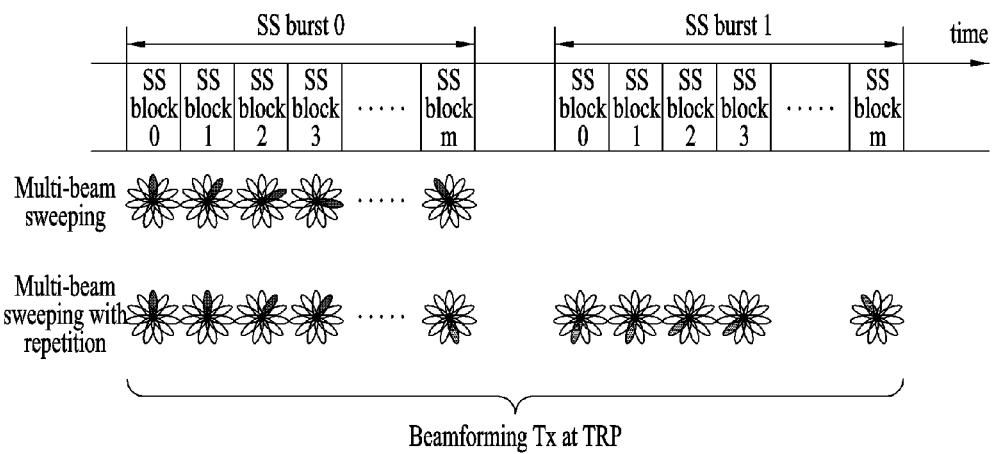
FIG. 7 is a diagram illustrating exemplary multi-beam transmission of SSBs, which is applicable to various embodiments of the present disclosure.

FIG. 7 illustrates exemplary multi-beam transmission of SSBs, which is applicable to various embodiments of the present disclosure.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SSB (index) group basis. In the latter case, the same SSB beam is maintained in an SSB (index) group. That is, the transmission (Tx) beam direction of an SSB is repeated over a plurality of successive SSBs. A maximum allowed transmission number L for an SSB in an SSB burst set is 4, 8 or 64 according to the frequency band of a carrier. Accordingly, a maximum number of SSB beams in the SSB burst set may also be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SSB beams is 1.

When the UE attempts initial access to the BS, the UE may align beams with the BS based on an SSB. For example, the UE detects SSBs and then identifies the best SSB. Subsequently, the UE may transmit an RACH preamble in a PRACH resource linked/corresponding to the index (i.e., beam) of the best SSB. The SSB may also be used for beam alignment between the BS and the UE even after the initial access.

1.6. Channel Measurement and Rate-Matching

Figure 8:
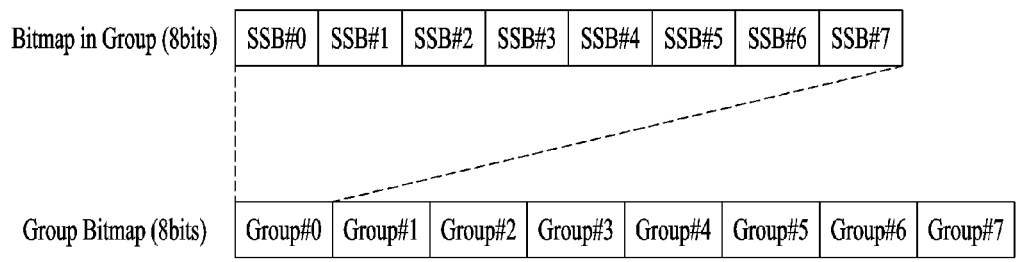

FIG. 8 is a diagram illustrating an exemplary method of indicating an actually transmitted SSB, SSB_tx, which is applicable to various embodiments of the present disclosure.

Up to L SSBs may be transmitted in an SSB burst set, and the number/positions of actually transmitted SSBs may be different for each BS/cell. The number/positions of actually transmitted SSBs are used for rate-matching and measurement, and information about the actually transmitted SSBs is indicated as follows.

Rate-matching-related: The information may be indicated by UE-specific RRC signaling or RMSI. The UE-specific RRC signaling includes full bitmaps (e.g., of length L) for FR1 and FR2. The RMSI includes a full bitmap for FR1 and a compressed bitmap for FR2 as illustrated. Specifically, the information about actually transmitted SSBs may be indicated by a group bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

Measurement-related: In RRC connected mode, the network (e.g., the BS) may indicate an SSB set to be measured within a measurement period. An SSB set may be indicated on a frequency layer basis. In the absence of an indication related to an SSB set, a default SSB set is used. The default SSB set includes all SSBs within a measurement period. The SSB set may be indicated by a full bitmap (e.g., of length L) of RRC signaling. In RRC idle mode, the default SSB set is used.

1.7. Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

1.7.1. DL BM Process

A DL BM process may include (1) transmission of beamformed DL RSs (e.g., CSI-RSs or SSBs) from a BS and (2) beam reporting from a UE.

The beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 9:
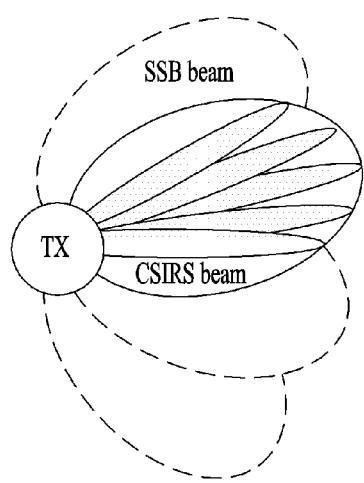
FIG. 9 is a diagram illustrating an exemplary method of indicating an actually transmitted SSB, SSB_tx, which is applicable to various embodiments of the present disclosure.

FIG. 9 is a diagram illustrating exemplary beamforming using an SSB and a CSI-RS, which is applicable to various embodiments of the present disclosure.

Figure 10:
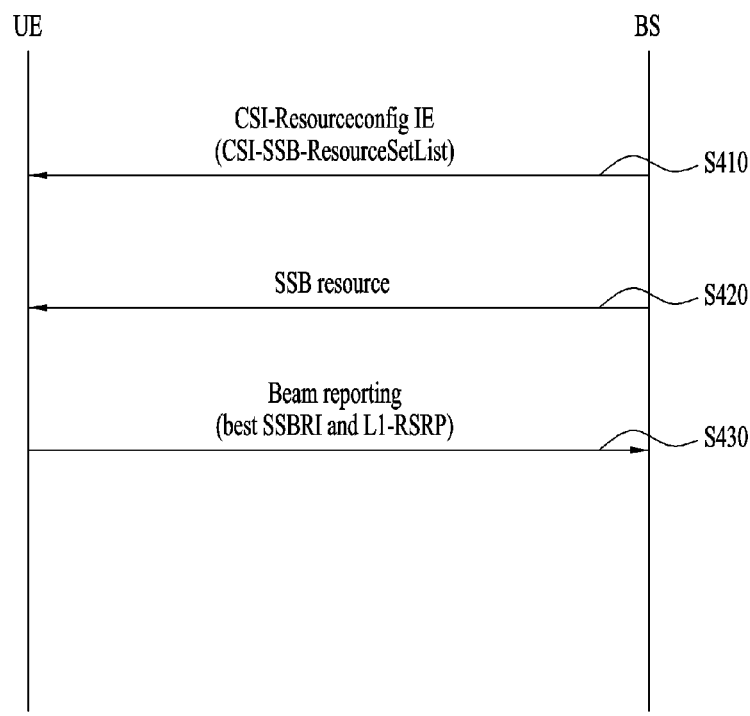
FIG. 10 is a flowchart illustrating an exemplary downlink (DL) beam management (BM) process using an SSB, which is applicable to various embodiments of the present disclosure.

Referring to FIG. 9, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive SSBs for the same SSBRI, while changing an Rx beam across multiple SSB bursts at a UE. One SS burst includes one or more SSBs, and one SS burst set includes one or more SSB bursts 1.7.1.1. DL BM Using SSB FIG. 10 is a diagram illustrating a signal flow for an exemplary DL BM process using an SSB.

An SSB-based beam report is configured during CSI/beam configuration in RRC CONNECTED mode.

A UE receives a CSI-ResourceConfig information element (IE) including CSI-SSB-ResourceSetList for SSB resources used for BM from a BS (S1610). The RRC parameter, csi-SSB-ResourceSetList is a list of SSB resources used for BM and reporting in one resource set. The SSB resource set may be configured as {SSB×1, SSB×2, SSB×3, SSB×4, . . . }. SSB indexes may range from 0 to 63.

The UE receives signals in the SSB resources from the BS based on CSI-SSB-ResourceSetList (420).

When CSI-RS reportConfig related to an SSBRI and RSRP reporting has been configured, the UE reports a best SSBRI and an RSRP corresponding to the best SSBRI to the BS (430). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

1.7.1.2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used as a tracking reference signal (TRS); and iii) when either of Repetition or TRS_info is not configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams.

Figure 11:
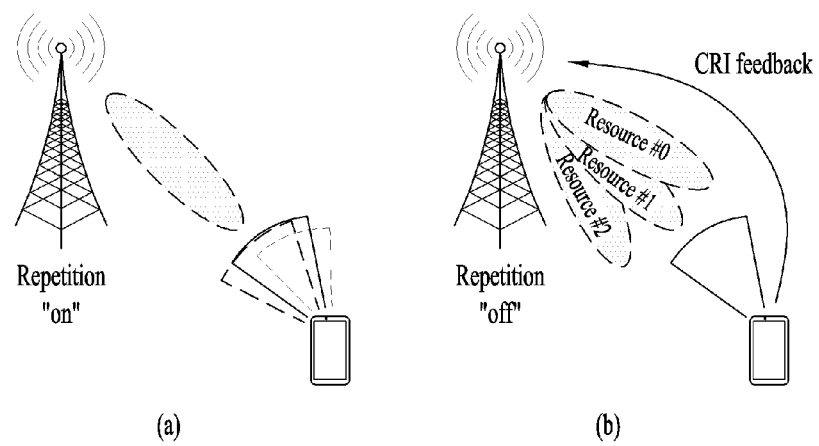
FIG. 11 is a diagram illustrating an exemplary DL BM process using a CSI-RS, which is applicable to various embodiments of the present disclosure.

FIG. 11 illustrates an exemplary DL BM process using a CSI-RS, which is applicable to various embodiments of the present disclosure.

FIG. 11(a) illustrates an Rx beam determination (or refinement) process of a UE, and FIG. 11(b) illustrates a Tx beam sweeping process of a BS. Further, FIG. 11(a) is for a case in which Repetition is set to 'ON', and FIG. 11(b) is for a case in which Repetition is set to 'OFF'.

With reference to FIGS. 11(a) and 12, an Rx beam determination process of a UE will be described below.

FIG. 12 is a diagram illustrating a signal flow for an exemplary Rx beam determination process of a UE.

The UE receives an NZP CSI-RS resource set IE including an RRC parameter 'repetition' from a BS by RRC signaling (610). The RRC parameter 'repetition' is set to 'ON' herein.

The UE repeatedly receives signals in resource(s) of a CSI-RS resource set for which the RRC parameter 'repetition' is set to 'ON' on the same Tx beam (or DL spatial domain Tx filter) of the BS in different OFDM symbols (620).

The UE determines its Rx beam (630).

The UE skips CSI reporting (640). That is, the UE may skip CSI reporting, when the RRC parameter 'repetition' is set to 'ON'.

Figure 13:
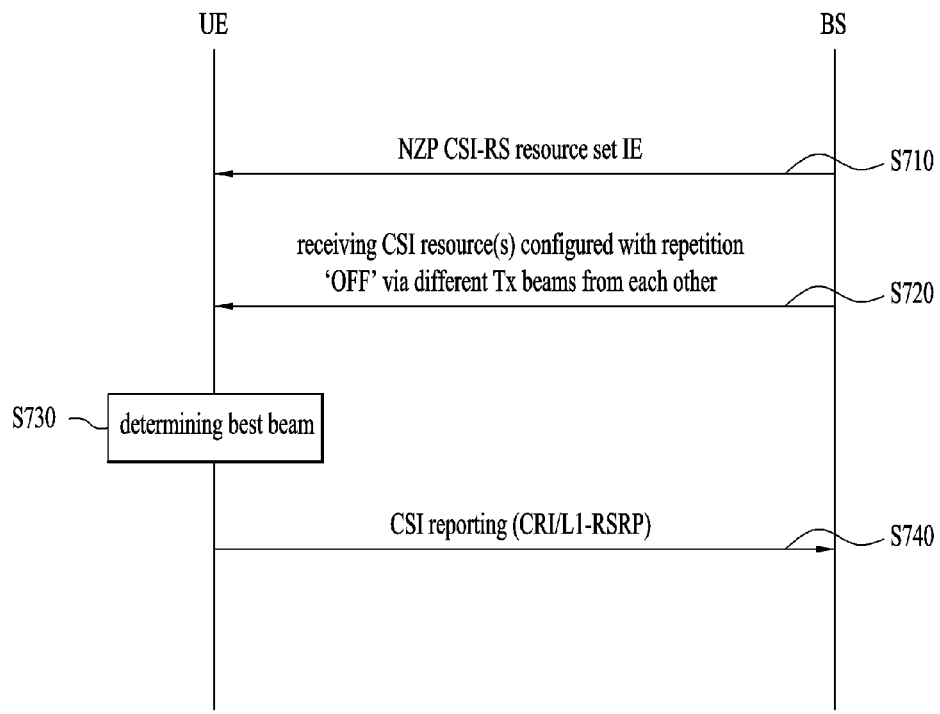
FIG. 13 is a flowchart illustrating an exemplary process of determining a transmission beam by a base station (BS), which is applicable to various embodiments of the present disclosure.

With reference to FIGS. 11(b) and 13, a Tx beam determination process of a BS will be described below.

FIG. 13 is a diagram illustrating an exemplary Tx beam determination process of a BS, which is applicable to various embodiments of the present disclosure.

A UE receives an NZP CSI-RS resource set IE including an RRC parameter 'repetition' from the BS by RRC signaling (710). Herein, the RRC parameter 'repetition' is set to 'OFF', which is related to a Tx beam sweeping process of the BS.

The UE receives signals in resource(s) of a CSI-RS resource set for which the RRC parameter 'repetition' is set to 'OFF' on different Tx beams (or DL spatial domain Tx filters) of the BS (720).

The UE selects (or determines) a best beam (740).

The UE reports the ID (e.g., CRI) of the selected beam and related quality information (e.g., an RSRP) to the BS (740). That is, the UE reports a CRI and an RSRP corresponding to the CRI to the BS, when a CSI-RS is transmitted for BM.

Figure 14:
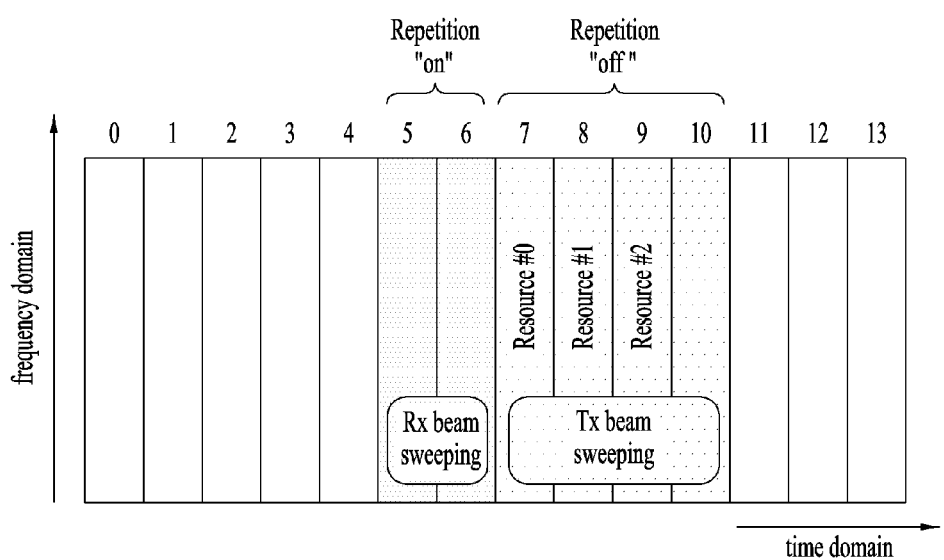
FIG. 14 is a diagram illustrating exemplary resource allocation in the time and frequency domains.

FIG. 14 is a diagram illustrating exemplary resource allocation in the time and frequency domains.

For example, time and frequency resources may be for the DL BM process of FIG. 11

When repetition is set to 'ON' for a CSI-RS resource set, the same Tx beam may be repeatedly used for a plurality of CSI-RS resources, whereas when repetition is set to 'OFF' for the CSI-RS resource set, different CSI-RS resources may be transmitted on different Tx beams.

1.7.1.3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 9 describes an example of a TCI-State IE. The TC-State IE is related to a QCL type corresponding to one or two DL RSs.

TABLE 9

TCI-State
The IE TCI-State associates one or two DL reference signals
with a corresponding quasi-colocation (QCL) type.
TCI-State information element

```
-- ASN1START
-- TAG-TCI-STATE-START
TCI-State ::=            SEQUENCE {
    tci-StateId          TCI-StateId.
    qcl-Type1            QCL-Info,
    qcl-Type2            QCL-Info                 OPTIONAL, -- Need R
    ...
}
QCL-Info ::=             SEQUENCE {
    cell                 ServCellIndex            OPTIONAL, -- Need R
    bwp-Id               BWP-Id                   OPTIONAL, -- Cond CSI-RS-Indicated
    referenceSignal      CHOICE {
```

TABLE 9-continued

TCI-State
The IE TCI-State associates one or two DL reference signals
with a corresponding quasi-colocation (QCL) type.
TCI-State information element

```
        csi-rs           NZP-CSI-RS-ResourceId,
        ssb              SSB-Index
    },
    qcl-Type             ENUMERATED {typeA, typeB, typeC, typeD},
    ...
}
-- TAG-TCI-STATE-STOP
-- ASN1STOP
```

In Table 9, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

1.7.2. UL BM Process

The DL BM process may include (1) transmission of beamformed DL RSs (e.g., CSI-RSs or SSBs) from a BS and (2) beam reporting from a UE.

In UL BM, reciprocity (or beam correspondence) between a Tx beam and an Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

Like DL BM, the UL BM process may be divided into a UE's Tx beam sweeping and a BS's Rx beam sweeping.

Figure 15:
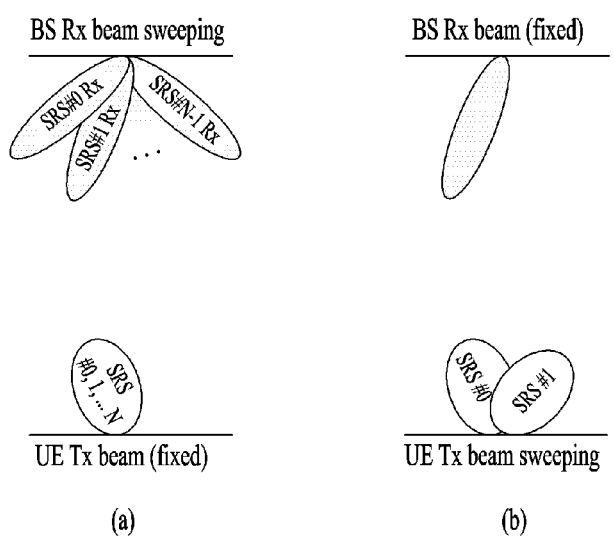
FIG. 15 is a diagram illustrating an exemplary uplink (UL) BM process using a sounding reference signal (SRS), which is applicable to various embodiments of the present disclosure.

FIG. 15 illustrates an exemplary UL BM process using a SRS, which is applicable to various embodiments of the present disclosure.

FIG. 15(a) illustrates an Rx beamforming determination process of a BS, and FIG. 15(b) illustrates a Tx beam sweeping process of a UE.

Figure 16:
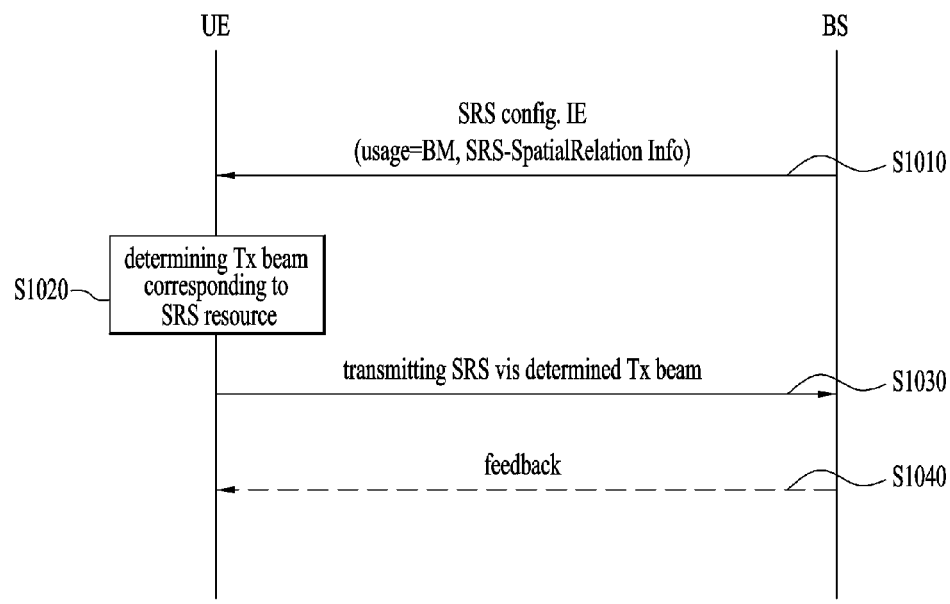
FIG. 16 is a flowchart illustrating an exemplary UL BM process using an SRS, which is applicable to various embodiments of the present disclosure.

FIG. 16 is a diagram illustrating a signal flow for an exemplary UL BM process using an SRS, which is applicable to various embodiments of the present disclosure.

FIG. 16 is a diagram illustrating a signal flow for an exemplary UL BM process using an SRS, which is applicable to various embodiments of the present disclosure.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationInfo is configured for an SRS resource, the same beamforming as used for the SSB, the CSI-RS, or the SRS is applied for transmission. However, if SRS-SpatialRelationInfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationInfo is set to SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

1.7. QCL (Quasi Co-Located or Quasi Co-Location)

The UE may receive a list of up to M TCI-State configurations to decode a PDSCH according to a detected PDCCH carrying DCI intended for the UE and a given cell. M depends on a UE capability.

Figure 17:
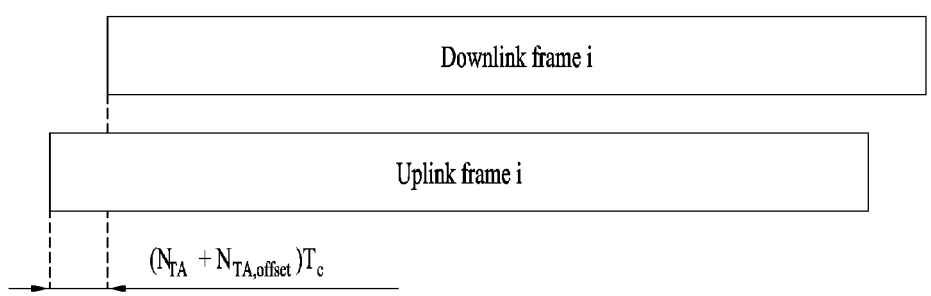
FIG. 17 is a diagram illustrating an exemplary UL-DL timing relationship, which is applicable to various embodiments of the present disclosure.

Referring to FIG. 17, a UE starts to transmit UL frame i $T_{TA}=(N_{TA}+N_{TA,offset})T_c$ seconds before transmission of a DL radio frame corresponding to UL radio frame i. However, $T_{TA}=0$ is exceptionally used for msgA transmission on a PUSCH.

Each parameter may be defined as described in Table 10 below.

TABLE 10

| $N_{TA}$ |
|---|
| In case of random access response, a timing advance command [11, TS 38.321]. $T_A$, for a TAG indicates $N_{TA}$ values by index values of $T_A$ = 0, 1, 2, . . . , 3846, where an amount of the time alignment for the TAG with SCS of $2^\mu \cdot 15$ kHz is $N_{TA} = T_A \cdot 16 \cdot 64/2^\mu$. $N_{TA}$ is defined in [4, TS 38.211] and is relative to the SCS of the first uplink transmission from the UE after the reception of the random access response. |
| In other cases, a timing advance command [11, TS 38.321]. $T_A$, for a TAG indicates adjustment of a current $N_{TA}$ value, $N_{TA,\ old}$, to the new $N_{TA}$ value, $N_{TA,\ new}$, by index values of $T_A$ = 0, 1, 2, . . ., 63, where for a SCSof $2^\mu \cdot 15$ kHz, $N_{TA,\ new} = N_{TA,\ old} + (T_A - 31) \cdot 16 \cdot 64/2^\mu$. |

| $N_{TA\ offset}$ | |
|---|---|
| Frequency range and band of cell used for uplink transmission | $N_{TA\ offset}$ (Unit: Tc) |
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

| $T_C = 0.509$ ns |
|---|

Note 1:
The UE identifies $N_{TA\ offset}$ based on the infomation n-TimingAdvanceOffset as specified in TS 38.331 [2], If UE is not provided with the information n-TimingAdvanceOffset, the default value of $N_{TA\ offset}$ is set as 25600 for FR1 band, In case of multiple UL carriers in the same TAG, UE expects that the same value of n-TimingAdvanceOffset is provided for all the UL carriers according to clause 4.2 in TS 38,213 [3] and the value 39936 of $N_{TA\ offset}$ can also be provided for a FDD serving cell.
Note 2:
Void Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'gel-Type' included in QCL-Info, and may have one of the following values.
    'QCL-TypeA': {Doppler shift, Doppler spread, average delay, delay spread}
    'QCL-TypeB': {Doppler shift, Doppler spread}
    'QCL-TypeC': {Doppler shift, average delay}
    'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

1.8. UL-DL Timing Relationship

FIG. 17 is a diagram illustrating an exemplary UL-DL timing relationship applicable to various embodiments of the present disclosure.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 18:
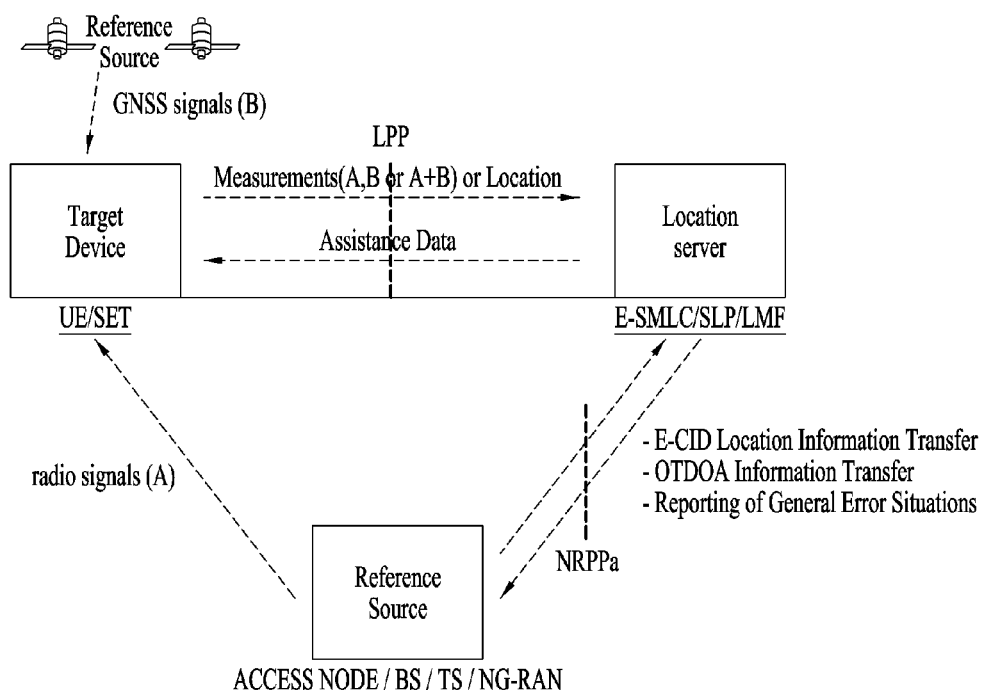
FIG. 18 is a diagram illustrating an exemplary positioning protocol configuration for UE positioning, which is applicable to various embodiments of the present disclosure.

FIG. 18 is a diagram illustrating an exemplary positioning protocol configuration for UE positioning, to which various embodiments of the present disclosure are applicable.

Referring to FIG. 18, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:
E-CID Location Information Transfer. This function allows exchange of location information between a reference source and an LMF, for the purpose of E-CID positioning.
OTDOA Information Transfer. This function allows exchange of information between the reference source and the LMF for the purpose of OTDOA positioning.
Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]
$$m = 0, 1, \ldots, 2N_{RB}^{max,DL} - 1$$

In Equation 1, $n_s$ denotes a slot number in a radio frame and 1 denotes an OFDM symbol number in a slot. $N_{RB}^{max,DL}$ the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \mod 512)+1) + 2 \cdot (N_{ID}^{PRS} \mod 512) + N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 19:
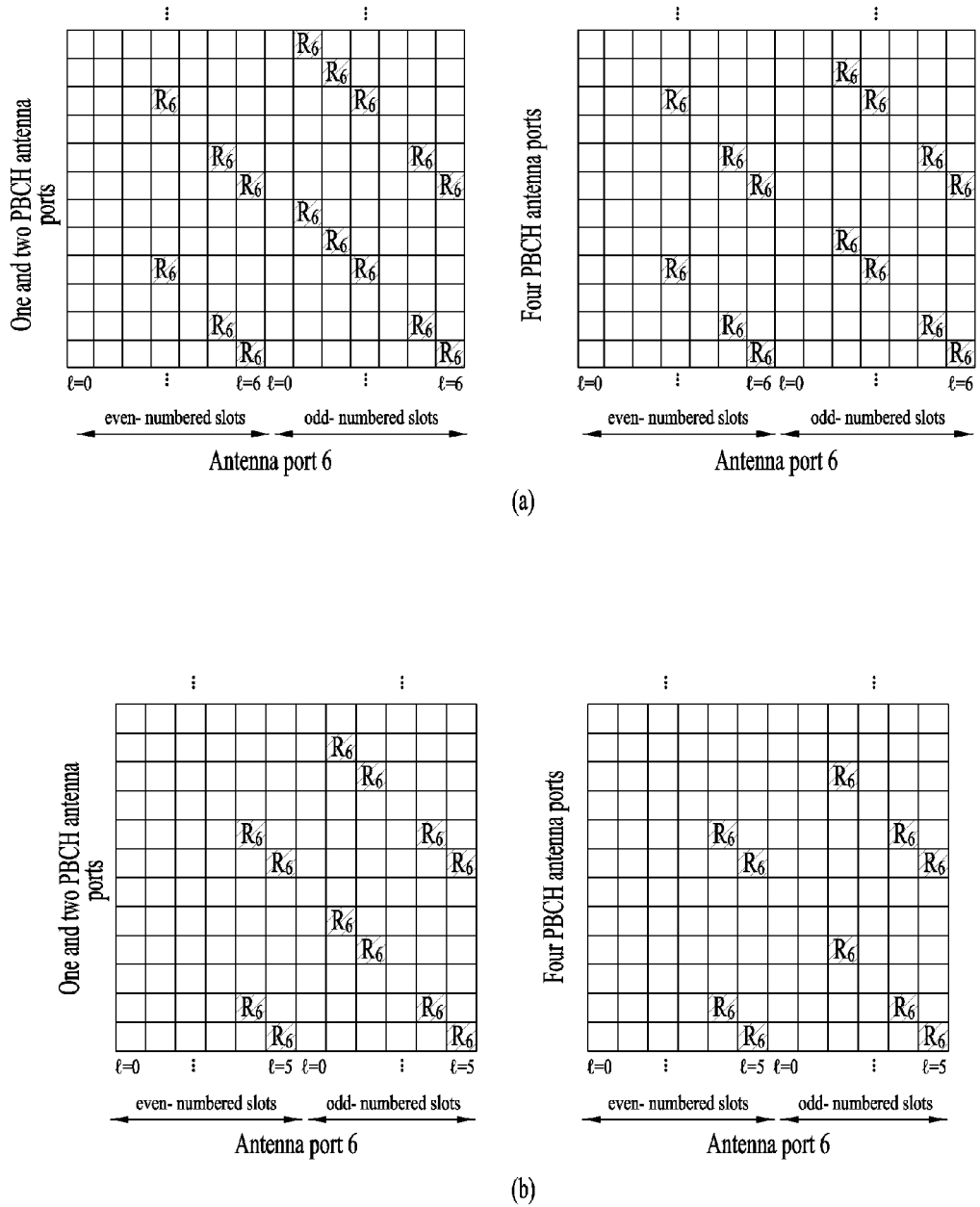
FIG. 19 illustrates exemplary mapping of a positioning reference signal (PRS) in a long term evolution (LTE) system to which various embodiments of the present disclosure are applicable.

FIG. 19 illustrates an exemplary pattern to which a PRS is mapped in a subframe.

As illustrated in FIG. 19, the PRS may be transmitted through an antenna port 6. FIG. 7(a) illustrates mapping of the PRS in the normal CP and FIG. 7(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 11

| PRS configuration Index ($I_{PRS}$) | PRS periodicity (subframes) | PRS subframe offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 20:
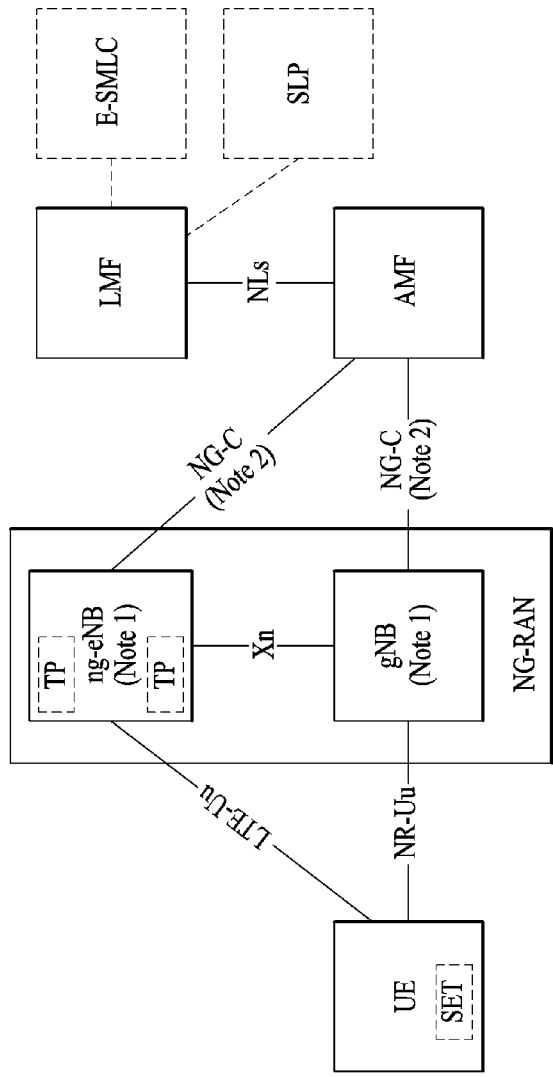
FIG. 20 is a diagram illustrating an example of an architecture of a system for positioning a UE, to which various embodiments of the present disclosure are applicable.

FIG. 20 illustrates architecture of a 5G system applicable to positioning of a UE connected to an NG-RAN or an E-UTRAN.

Referring to FIG. 20, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 21:
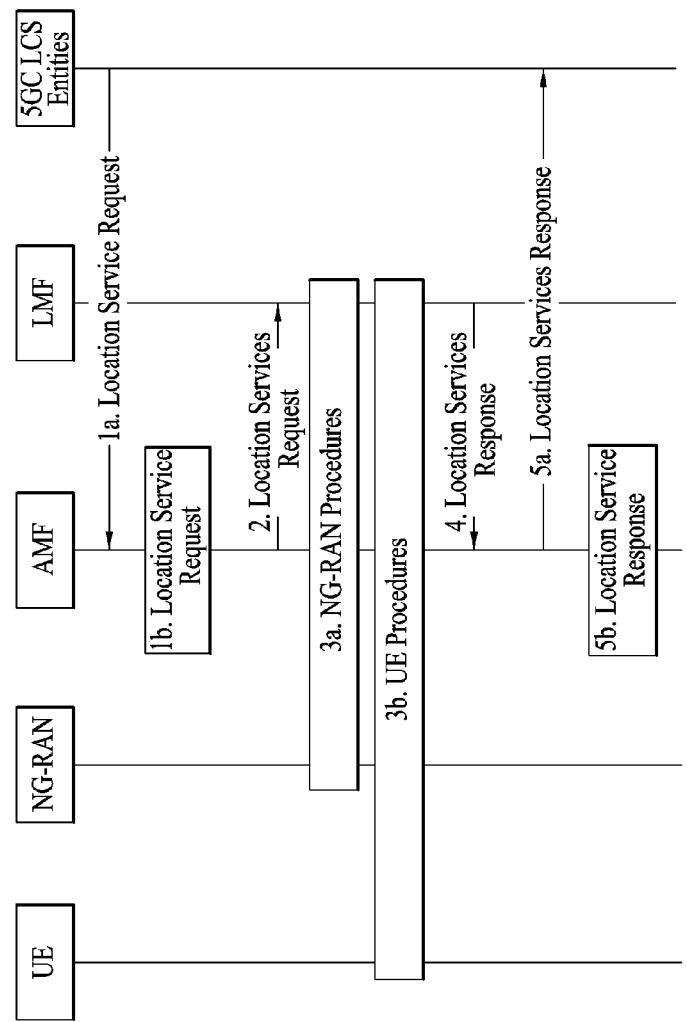
FIG. 21 is a diagram illustrating an example of a procedure of positioning a UE, to which various embodiments of the present disclosure are applicable.

FIG. 21 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol 2.5.1. LTE Positioning Protocol (LPP)

Figure 22:
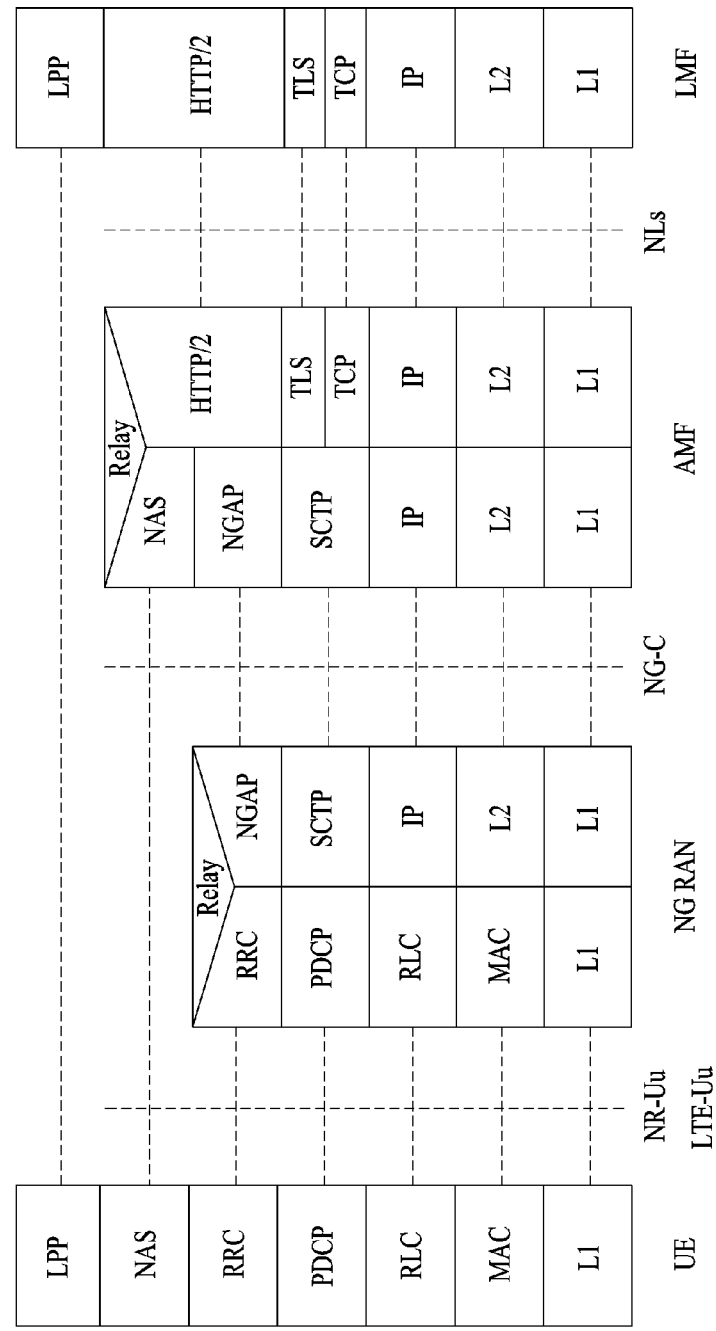
FIG. 22 is a diagram illustrating protocol layers for supporting LTE positioning protocol (LPP) message transmission, to which various embodiments are applicable.

FIG. 22 illustrates an exemplary protocol layer used to support LPP message transfer between an LMF and a UE. An LPP protocol data unit (PDU) may be carried in a NAS PDU between an AMF and the UE.

Referring to FIG. 22, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol a (NRPPa)

Figure 23:
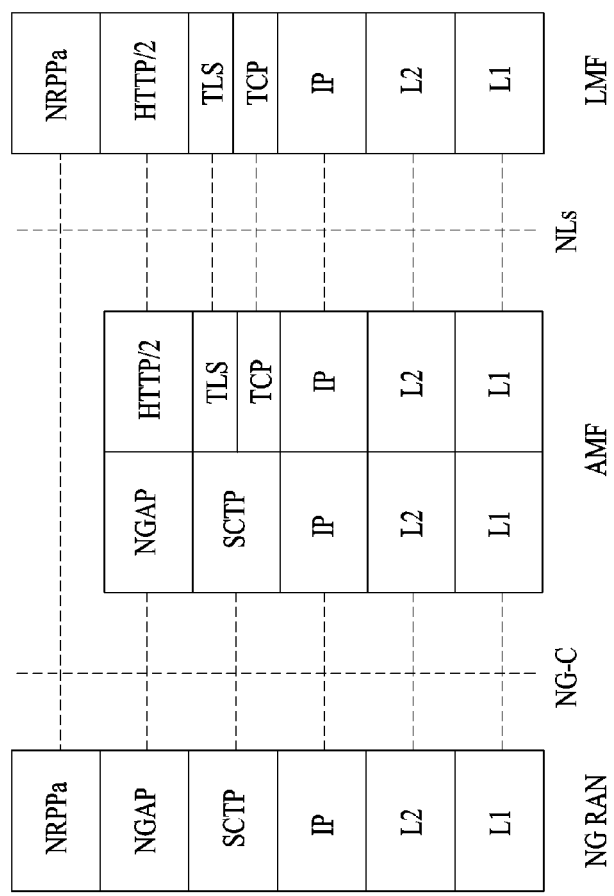
FIG. 23 is a diagram illustrating protocol layers for supporting NR positioning protocol A (NRPPa) protocol data unit (PDU) transmission, to which various embodiments are applicable.

FIG. 23 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 24:
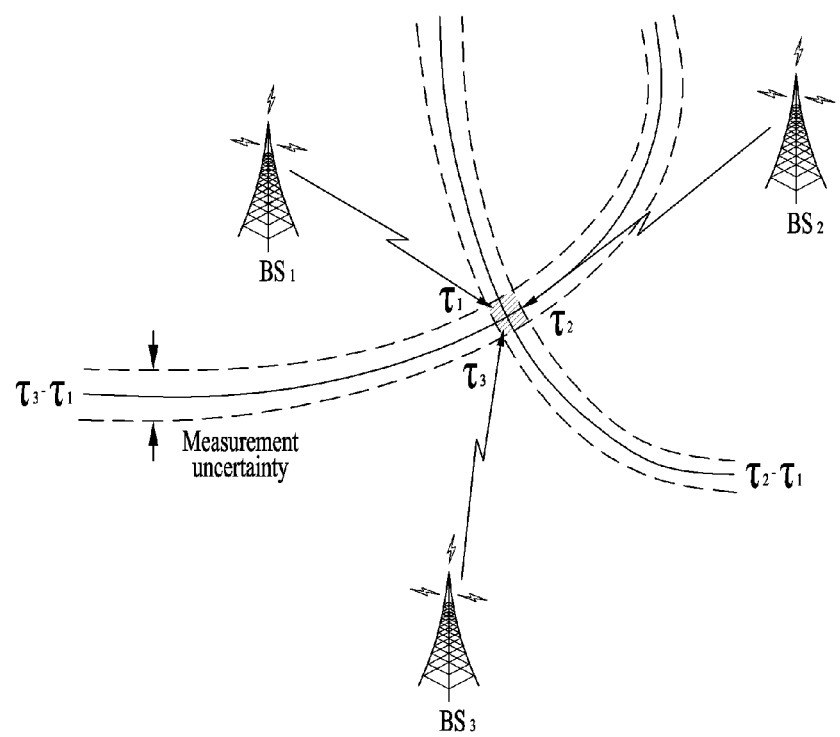
FIG. 24 is a diagram illustrating an observed time difference of arrival (OTDOA) positioning method, to which various embodiments are applicable.

FIG. 24 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi_{,1} = \frac{\sqrt{(x_t - x_i)^2 + (y_t - y_i)^2}}{c} - \quad\quad\text{[Equation 3]}$$

$$\frac{\sqrt{(x_t - x_1)^2 + (y_t - y_1)^2}}{c} + (T_i - T_1) + (n_i - n_1)$$

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_1$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 25:
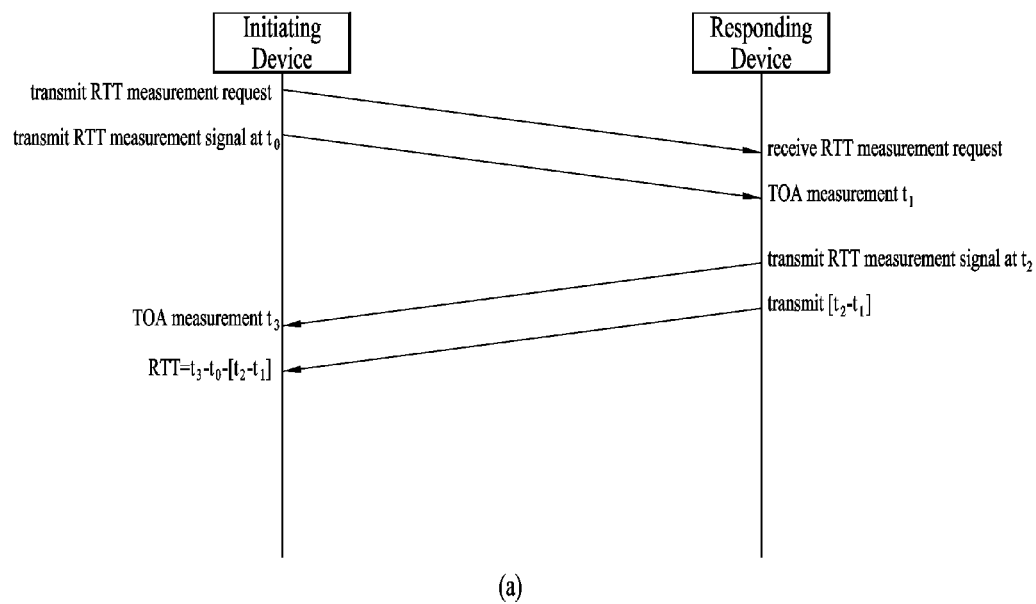
FIG. 25 is a diagram illustrating a multi-round trip time (multi-RTT) positioning method to which various embodiments are applicable.
Figure 25:
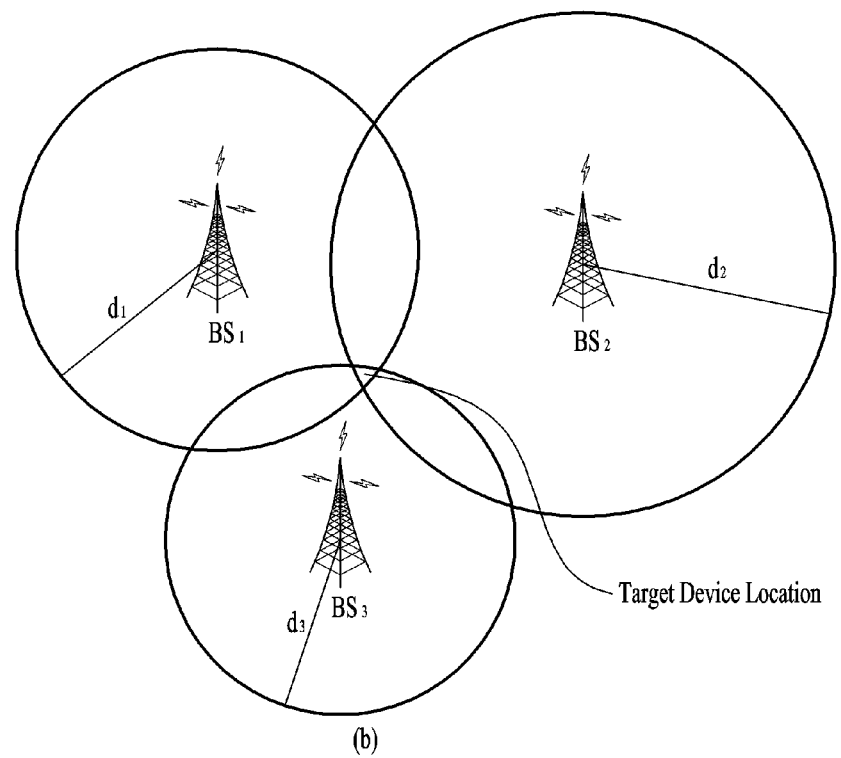

FIG. 25 is a diagram illustrating an exemplary multi-RTT positioning method to which various embodiments of the present disclosure are applicable.

Referring to FIG. 25(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 2501 according to an exemplary embodiment, the initiating device may transmit an RTT measurement request, and the responding device may receive the RTT measurement request.

In operation 2503 according to an exemplary embodiment, the initiating device may transmit an RTT measurement signal at time $t_0$, and the responding device may obtain TOA measurement $t_1$.

In operation 2505 according to an exemplary embodiment, the responding device may transmit an RTT measurement signal at time $t_2$, and the initiating device may obtain TOA measurement $t_3$.

In operation 2507 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 2505.

$$RTT = t_3 - t_0 - [t_2 - t_1] \qquad \text{[Equation 4]}$$

Referring to FIG. 25(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

AOA (AoA): angle of arrival
CSI-RS: channel state information reference signal
ECID: enhanced cell identifier GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal
RTT: round trip time
RSRP: reference signal reception power
RSTD: reference signal time difference/relative signal time difference
SRS: sounding reference signal
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UTDOA (UTDoA): uplink time difference of arrival Various embodiments of the present disclosure described below may relate to an effective UE positioning method.

The various embodiments of the present disclosure described below may relate to a UE positioning method based on an SSB and/or a CSI-RS.

An example of the various embodiments of the present disclosure described below may be given as follows.
  narrow-band+wide-band RS transmission for positioning
    SS/PBCH block (narrow-band)+PRS (wide-band)
  positioning triggering=>SS/PBCH block measurement+ UE reporting+aperiodic/periodic/semi-persistent PRS transmission+additional UE reporting
  positioning triggering: UE and/or LMF In example of the various embodiments of the present disclosure described below may be given as follows. In the following example, SSB may be replaced with CSI-RS.
  For example, a UE may indicate, to a BS and/or an LMF, the direction of a beam carrying an SSB satisfying a predetermined condition related to measurements related to received SSBs among the received SSBs. And/or, for example, the UE may request the BS and/or the LMF to transmit a PRS on a beam in the same direction as the beam direction.
    For example, the request may be a request for changing an SSB index configured with QCL (type-D) in a specific PRS resource to the index of the SSB satisfying the predetermined condition.
  For example, the predetermined condition may include a condition that the SSB should have the minimum of propagation times/ToAs/ToFs measured in the SSBs and/or a condition that the SSB should have the maximum of RSRPs measured in the SSBs, and the SSB satisfying the predetermined condition may satisfy one or more of the conditions.
  For example, one or more of TPs/PRS resources/PRS resource sets for configuring a reference timing for RSTD calculation may be configured based on the SSB satisfying the predetermined condition and/or in relation to the SSB satisfying the predetermined condition.
    For example, a PRS resource related to a PRS received on a beam in the same direction as the beam carrying the SSB satisfying the predetermined condition may be configured as a reference PRS resource.

The following description is given of various embodiments of the present disclosure with the appreciation that a correlation search window (size) configuration is regarded as an RSTD uncertainty configuration defined/presented in TS 36.355. This is because when the UE determines a correlation search window, the UE may use an RSTD uncertainty value configured/indicated by the LMF and/or the location server. For example, the RSTD uncertainty configuration may be conceptually understood as the same as or equivalent to the correlation search window configuration.

For example, referring to TS 36.355, OTDOA-NeighbourCellInfoList may include expectedRSTD (INTEGER (0 . . . 16383)) indicating an RSTD value expected to be measured between a neighbor cell and a reference cell by a target device and expectedRSTD-Uncertainty (INTEGER (0 . . . 1023)) indicating the uncertainty of the expectedRSTD value. For example, expectedRSTD-Uncertainty may be regarded as and/or understood as equivalent to and/or understood as related to a correlation search window (size) configuration in the following description of various embodiments of the present disclosure.

Figure 26:
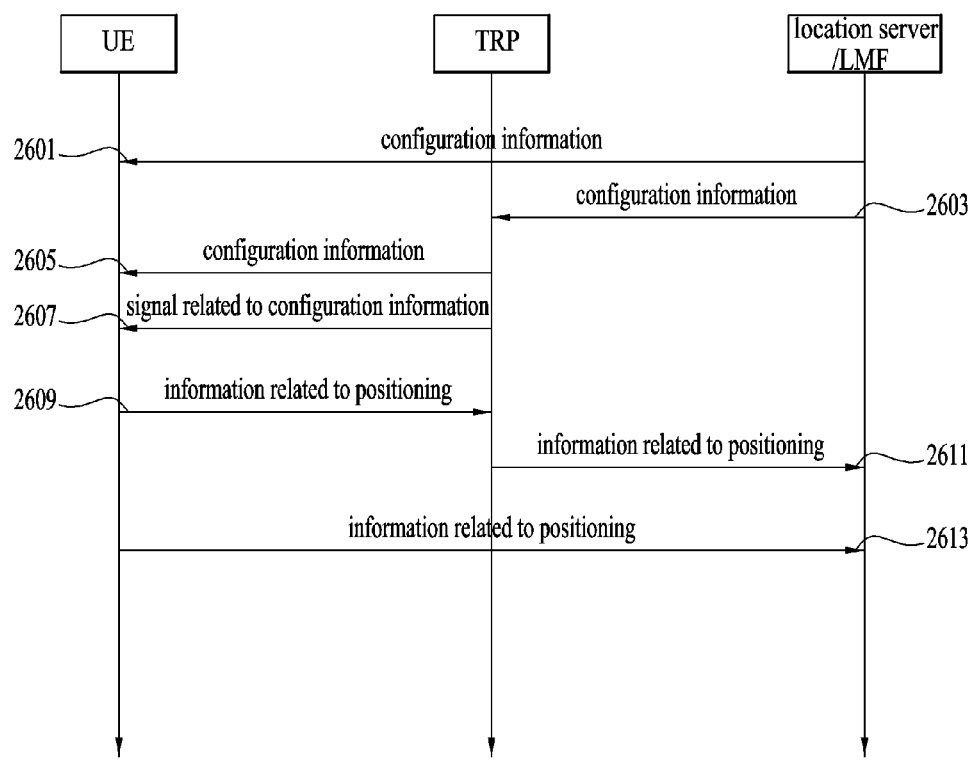
FIG. 26 is a simplified diagram illustrating a method of operating a UE, a transmission and reception point (TRP), a location server, and/or a location management function (LMF) according to various embodiments.

FIG. 26 is a simplified diagram illustrating a method of operating a UE, a TRP, a location server, and/or an LMF according to various embodiments of the present disclosure.

Referring to FIG. 26, the location server and/or the LMF may transmit configuration information to the UE, and the UE may receive the configuration information, in operation 2601 according to an exemplary embodiment.

In operation 2603 according to an exemplary embodiment, the location server and/or the LMF may transmit reference configuration information to the TRP, and the TRP may receive the reference configuration information. In operation 2605 according to an exemplary embodiment, the TRP may transmit the reference configuration information to the UE, and the UE may receive the reference configuration information. In this case, operation 2601 according to an exemplary embodiment may be skipped.

On the contrary, operations 2603 and 2605 according to an exemplary embodiment may be skipped. In this case, operation 2601 according to an exemplary embodiment may be performed.

That is, operation 2601 according to an exemplary embodiment, and operations 2603 and 2605 according to an exemplary embodiment may be optional.

In operation 2607 according to an exemplary embodiment, the TRP may transmit a signal related to the configuration information, and the UE may receive the signal. For example, the signal related to the configuration information may be a signal for positioning the UE.

In operation 2609 according to an exemplary embodiment, the UE may transmit a positioning-related signal to the TRP, and the TRP may receive the positioning-related signal. In operation 2611 according to an exemplary embodiment, the TRP may transmit the positioning-related signal to the location server and/or the LMF, and the location server and/or the LMF may receive the positioning-related signal.

In operation 2613 according to an exemplary embodiment, the UE may transmit the positioning-related signal to the location server and/or the LMF, and the location server and/or the LMF may receive the positioning-related signal. In this case, operations 2609 and 2611 according to an exemplary embodiment may be skipped.

On the contrary, operation 2613 may be skipped. In this case, operations 2609 and 2611 according to an exemplary embodiment may be performed.

That is, operations 2609 and 2611 according to an exemplary embodiment, and operation 2613 according to an exemplary embodiment may be optional.

In an exemplary embodiment, the positioning-related signal may be obtained based on the configuration information and/or the signal related to the configuration information.

Figure 27:
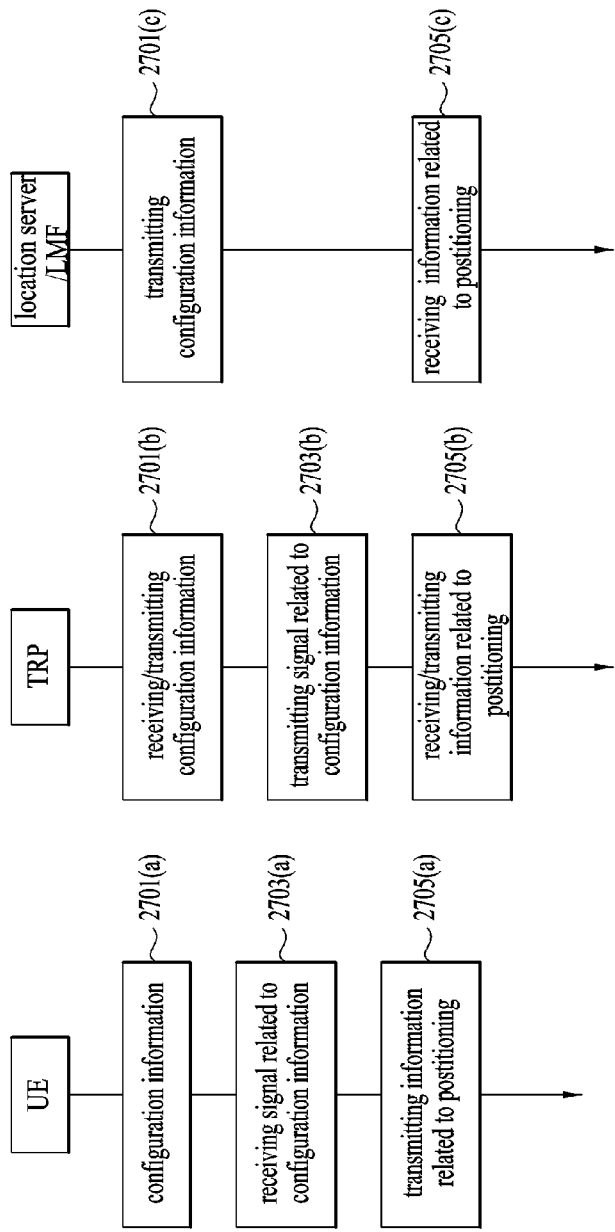
FIG. 27 is a simplified diagram illustrating a method of operating a UE, a TRP, a location server, and/or an LMF according to various embodiments.

FIG. 27 is a simplified diagram illustrating a method of operating a UE, a TRP, a location server, and/or an LMF according to various embodiments of the present disclosure.

Referring to FIG. 27(a), the UE may receive configuration information in operation 2701(a) according to an exemplary embodiment.

In operation 2703(a) according to an exemplary embodiment, the UE may receive a signal related to the configuration information.

In operation 2705(a) according to an exemplary embodiment, the UE may transmit positioning-related information.

Referring to FIG. 27(b), the TRP may receive the configuration information from the location server and/or the LMF and transmit the received configuration information to the UE in operation 2701(b) according to an exemplary embodiment.

In operation 2703(b) according to an exemplary embodiment, the TRP may transmit a signal related to the configuration information.

In operation 2705(b) according to an exemplary embodiment, the TRP may receive the positioning-related information and transmit the received positioning-related information to the location server and/or the LMF.

Referring to FIG. 27(c), the location server and/or the LMF may transmit the configuration information in operation 2701(c) according to an exemplary embodiment.

In operation 2705(c) according to an exemplary embodiment, the location server and/or the LMF may receive the positioning-related information.

For example, the configuration information may be understood as related to reference configuration (information) and one or more pieces of information transmitted/configured to/for the UE by the location server and/or the LMF and/or the TRP, and/or understood as the reference configuration (information) and the one or more pieces of information transmitted/configured to/for the UE by the location server and/or the LMF and/or the TRP in the following description of various embodiments of the present disclosure.

For example, the positioning-related signal may be understood as a signal related to one or more pieces of information reported by the UE and/or as a signal including the one or more pieces of information reported by the UE in the following description of various embodiments of the present disclosure.

For example, a BS, a gNB, a cell, and so on may be replaced by a TRP, a TP, or any other device that plays the same role in the following description of various embodiments of the present disclosure.

For example, the location server may be replaced by the LMF or any other device playing the same role in the following description of various embodiments of the present disclosure.

More specific operations, functions, terms, and so on in an operation according to each exemplary embodiment may be performed and descried based on various embodiments of the present disclosure described below. Operations according to each exemplary embodiment are exemplary, and one or more of the above operations may be omitted according to the specific contents of each embodiment.

Various embodiments of the present disclosure will be described below in detail. Unless contradicting each other, the various embodiments of the present disclosure described below may be fully or partially combined to constitute other various embodiments of the present disclosure, which will be clearly understood to those skilled in the art.

3.1. SSB-Based On-Demand PRS Transmission

According to various embodiments of the present disclosure, PRS transmission and reception may be performed on demand from a UE. For example, the request of the UE may be based on an SSB.

For example, the UE may measure the RSRPs/ToAs/RSTDs of SSBs received from a serving cell and/or BS and/or TP and/or neighbor cell(s) (adjacent cell(s)) and/or BS(s) and/or TP(s), and request the BS and/or the LMF to transmit (and/or allocate) a PRS (a PRS resource and/or a PRS resource set) from a specific cell and/or BS and/or TP in the same Tx beam direction as a specific SSB (e.g., a specific SSB index and/or a specific SSB resource index) transmitted by the specific cell and/or BS and/or TP.

For example, the UE may request the BS and/or the LMF to transmit the PRS in the same direction as a Tx beam carrying an SSB (SSB resource index) having a largest RSRP and/or a shortest ToA/ToF/propagation time among a plurality of SSBs (e.g., SSB resources) transmitted by the specific cell and/or BS and/or TP.

For example, the PRS transmission request and/or PRS resource of the UE is an on-demand PRS resource, which may be semi-persistent/periodic.

3.2. SSB-Based Positioning

For example, considering that multiple cells may transmit SSBs by sharing the same time-frequency resources, a UE close to an inner cell (an inner-cell UE) may have difficulty in detecting an SSB from a neighbor cell. Accordingly, for example, it may be suitable to apply ECID-based UE positioning using an SSB to the UE.

On the contrary, for example, a UE at (close to) a cell edge (an outer-cell UE) may be capable of detecting SSBs transmitted by multiple cells, and obtain and report an Rx-Tx time difference measurement and/or an RSTD measurement based on the detected SSBs, thus performing multi-cell ECID-based and/or OTDOA-based UE positioning.

3.2.1. [Proposal #1] "Event-Based" Measurement of CSI-RS and/or SS/PBCH Block and/or Reporting of the Measurement (Event-based reporting) For example, when the UE is capable of detecting SSBs and/or CSI-RSs transmitted by one or more cells and/or BSs and/or TPs (e.g., two, three, or more cells and/or BSs and/or TPs, and the same thing applies to the following description), the UE may report to the BS and/or the LMF that the UE is "capable of SSB-based and/or CSI-RS-based OTDOA and/or multi-cell RTT UE positioning".

For example, the SSBs and/or the CSI-RSs may be ones configured for L1-RSRP measurement and/or L3-RSRP measurement. For example, an L1-RSRP may be obtained based on layer 1 (L1) filtering being applied to a measurement result, and an L3-RSRP may be obtained based on layer 3 (L3) filtering being applied to a measurement result.

For example, "a time when it is possible to detect SSBs and/or CSI-RSs" may be defined as a specific event. For example, the above-described reporting operation of the UE and/or this clause and/or various embodiments of the present disclosure may be considered to be an event-trigged and/or event-based operation of reporting that the UE is "capable of SSB-based and/or CSI-RS-based OTDOA and/or multi-cell RTT UE positioning", upon occurrence of this event.

For example, when the UE is capable of detecting SSBs and/or CSI-RSs transmitted by two, three, or more cells and/or BSs and/or TPs, and it is guaranteed that the reliability/quality of measurements (e.g., ToA/RSTD measurements and/or UE Rx-Tx time difference measurements) obtained from the SSBs and/or the CSI-RSs is equal to or greater than a predetermined level (e.g., one or more of the reliability and quality of the measurements is equal to or greater than thresholds for reliability and quality), the UE may report that the UE is "capable of SSB-based and/or CSI-RS-based OTDOA and/or multi-cell RTT UE positioning".

For example, the quality of the measurements may be defined or configured as the error rate and/or reliability of the obtained measurement values. For example, a measurement quality level may be defined/configured/indicated as a specific threshold for/to the UE. For example, the threshold may be related to one or more of predetermined respective thresholds for reliability and quality. For example, the BS and/or the LMF may configure/indicate the threshold for/to the UE. For example, the BS and/or the LMF may configure/indicate one or more of the above-described error rate and/or reliability and/or threshold for/to the UE.

For example, in the case where the serving cell and/or neighbor cell(s) transmits SSBs and/or CSI-RSs, when the SSBs and/or the CSI-RSs are transmitted in different time and/or frequency resources from the cells, the UE may receive SSBs and/or CSI-RSs from the other cell(s) except for the serving cell without any problem (interference or the like). However, when different cells transmit SSBs and/or CSI-RSs in overlapped time and/frequency resources, interference may occur. Further, for example, because another cell may transmit data and/or another RS in time and/or frequency resources in which a specific cell transmits an SSB and/or a CSI-RS, the UE may have a problem in distinguishing SSBs and/or CSI-RSs transmitted from multiple cells. The above-described multi-cell-based UE positioning method using event-based reporting according to various embodiments of the present disclosure may be advantageous particularly in this case.

For example, only when the UE is capable of detecting SSBs and/or CSI-RSs received from two, three, or more cells and/or BSs and/or TPs, the UE may report ToA/RSTD measurements and/or UE Rx-Tx time difference measurements to the BS and/or the LMF, restrictively (when the above-described event occurs). For example, when the UE reports the corresponding information, the BS and/or the LMF may consider and/or identify that the event that "the UE is capable of OTDOA and/or multi-cell RTT UE positioning" has occurred.

For example, the above-described UE operation may be configured/indicated by the BS and/or the LMF. For example, "only when the UE is capable of detecting SSBs and/or CSI-RSs received from two, three, or more cells and/or BSs and/or TPs, the BS and/or the LMF may configure/indicate to the UE to report ToA/RSTD measurements and/or UE Rx-Tx time difference measurements to the BS and/or the LMF, restrictively (when the above-described event occurs)", and the UE may perform an operation based on the configuration/indication.

For example, only when the UE is capable of detecting SSBs and/or CSI-RSs received from two or more cells and/or BSs and/or TPs, and it is guaranteed that one or more of the reliability and quality of ToA/RSTD measurements and/or UE Rx-Tx time difference measurements obtained from the SSBs and/or the CSI-RSs are equal to or greater than predetermined levels (for example, at least one of the reliability or quality of the measurement values is equal to or greater than a predetermined threshold for the at least one of the reliability or quality), the UE may report the ToA/RSTD measurements and/or UE Rx-Tx time difference measurements to the BS and/or the LMF.

For example, the above-described UE operation may be configured/indicated by the BS and/or the LMF. For example, "only when the UE is capable of detecting SSBs and/or CSI-RSs received from two or more cells and/or BSs and/or TPs, and the reliability/quality of ToA/RSTD measurements and/or UE Rx-Tx time difference measurements obtained from the SSBs and/or the CSI-RSs is equal to or greater than a predetermined level, the BS and/or the LMF may configure/indicate to the UE to report the ToA/RSTD measurements and/or UE Rx-Tx time difference measurements to the BS and/or the LMF", and the UE may perform an operation based on the configuration/indication.

For example, the quality of the above-described measurements may be defined/configured as an error rate and/or reliability of the obtained measurement values. For example, the measurement quality level may be defined/configured/indicated as a specific threshold value for/to the UE. For example, the threshold may be related to one or more of predetermined thresholds for the above-described reliability and quality. For example, the BS and/or the LMF may configure/indicate the thresholds for/to the UE. For example, the BS and/or the UE may configure/indicate one or more of the above-described error rate and/or reliability and/or thresholds for/to the UE.

3.2.2. [Proposal #2] Positioning Using CSI-RS and/or SS/PBCH Block

For example, the BS and/or the LMF may configure/indicate to the UE to measure the ToAs/RSTDs of SSBs and/or CSI-RSs as well as the RSRPs of the SSBs and/or the CSI-RSs. Further, for example, the BS and/or the LMF may configure/indicate to the UE to report ToA/RSTD information to the BS and/or the LMF.

For example, a specific UE may obtain ToA/RSTD measurements from (narrowband-based) SSBs/CSI-RSs transmitted from a serving cell and/or a neighbor cell of the UE and report the ToA/RSTD measurements to a BS and/or an LMF, so that a coarse location of the UE may be measured. For example, when the UE subsequently receives a (wideband-based) RS, the BS and/or the LMF may help the UE to compute correlations with low computation complexity by using coarse location information about the UE and/or ToA/RSTD report information.

For example, the UE may measure the ToAs/RSTDs of SSBs and/or CSI-RSs received from the serving cell and two neighbor cells, and report the ToA/RSTD measurements to the BS and/or the LMF. For example, the BS and/or the LMF may identify the coarse location of the UE based on the ToA/RSTD measurements (e.g., based on the report of the UE).

For example, when N (>=2) cells and/or BSs and/or TPs including the two neighbor cells configure specific RSs for UE positioning (e.g., PRSs) and/or RS (e.g., PRS) resources (and/or RS (e.g., PRS) resource sets) for the UE based on this (e.g., the coarse location of the UE), a correlation search widow may be appropriately configured. That is, for example, a correlation search window for each cell and/or BS and/or TP through which a PRS is transmitted to the UE may be configured/indicated based on the location of the UE.

For example, the coarse location of the UE may be a slightly more accurate (slightly more specific) location than a location indicating a cell to which the UE belongs. For example, the above-described coarse location of the UE may mean an approximate location of the UE obtained before a more specific location of the UE is obtained based on a PRS or the like.

According to various embodiments of the present disclosure described above, for example, the correlation computation complexity of the UE required to receive RSs and/or RS resource(s) (and/or RS resource set(s)) transmitted from N cells and/or BSs and/or TPs may be greatly reduced.

For example, it may be considered that the location server configures the RSTD uncertainty defined/presented in TS 36.355 for the UE, as an example of a correlation search window configuration. For example, the RSTD uncertainty configuration may be understood as the same as or equivalent to the correlation search window configuration. That is, the correlation search window size configuration may be considered to be the RSTD uncertainty configuration of the LMF and/or the location server in the description of various embodiments of the present disclosure.

For example, referring to TS 36.355, OTDOA-NeighbourCellInfoList may include expectedRSTD (INTEGER (0 . . . 16383)) indicating an RSTD value expected to be measured between a neighbor cell and a reference cell by a target device and expectedRSTD-Uncertainty (INTEGER (0 . . . 1023)) indicating the uncertainty of the expectedRSTD value. For example, expectedRSTD-Uncertainty may be regarded and/or conceptually understood as equivalent to and/or understood as related to a correlation search window (size) configuration in the description of various embodiments of the present disclosure.

For example, the following may be considered for technical advantages achievable by using the above-described SSBs and/or CSI-RSs.

For example, RSTD/ToA/UE Rx-Tx time difference measurement(s) of transmissions from (a relatively small number of, for example, a predetermined threshold number of or fewer/fewer) cells and/or BSs and/or TPs is reported once/periodically/semi-periodically, and measurements of PRSs transmitted later based on the report may be persistently reported.

That is, for example, the BS and/or the LMF may configure/indicate one-time/periodic/semi-periodic reporting of the RSTD/ToA/UE RX-TX time different measurement(s) of specific SSBs and/or CSI-RSs (and/or SSB resource(s) and/or CSI-RS resource(s)).

For example, the UE may measure and/or report the ToAs/RSTDs of SSBs and/or CSI-RSs transmitted from a specific neighbor cell/BS, and determine/adjust/configure/reconfigure a correlation search window for an RS (e.g., PRS) and/or an RS (e.g., PRS) resource (and/or an RS (e.g., PRS) resource set) transmitted from the specific cell/BS/TP by using ToA/RSTD measurement information about an SSB and/or a CSI-RS transmitted from the specific cell/BS/TP. Particularly, for example, the UE may autonomously determine/adjust/configure/reconfigure a correlation search window for receiving an RS (e.g., PRS) and/or an RS (e.g., PRS) resource (and/or an RS (e.g., PRS) resource set) transmitted on a specific Tx beam from the specific cell/BS/TP by using ToA/RSTD measurement information about an SSB resource and/or a CSI-RS resource transmitted on the specific TX beam from the specific cell/BS/TP.

For example, upon receipt of a configuration for an RS (e.g., PRS) and/or RS (e.g., PRS) resource (and/or RS (e.g., PRS) resource set) transmitted from the specific cell/BS/TP RS for which the correlation search window has been determined/adjusted/configured/reconfigured from the BS and/or the LMF (and/or upon receipt of a configuration for an RS (e.g., PRS) and/or RS (e.g., PRS) resource (and/or RS (e.g., PRS) resource set) transmitted on a Tx beam from the specific cell/BS/TP RS for which the correlation search window has been determined/adjusted/configured/reconfigured from the BS and/or the LMF), the UE may ignore the indicated correlation search window configuration based on the above-described UE operation.

That is, for example, the correlation search window determined/adjusted/configured/reconfigured based on SSBs and/or CSI-RSs by the UE may have priority over the correlation search window that the BS and/or the LMF configures/indicates together with a configuration for an RS (e.g., PRS) and/or RS (e.g., PRS) resource (and/or RS (e.g., PRS) resource set) for UE positioning.

For example, when the UE fails in receiving a configuration/indication for a correlation search window from the BS and/or the LMF in measuring the RSTDs/ToAs and/or Rx-Tx time differences of SSBs and/or CSI-RSs (e.g., SSBs and/or CSI-RSs for L1-RSRP measurement and/or L3-RSRP measurement), the UE may use a correlation search window of a maximum size by default (among predetermined candidates for a correlation search window size or within an allowed range). And/or, for example, the BS and/or the LMF may signal information about the coverage/cell radius of a cell/BS/TP servicing the UE to the UE to help the UE to determine/use a correlation search window based on the information.

For example, when an SSB is used for the purpose of UE positioning (e.g., the BS and/or the LMF indicates measurement and reporting of the ToA/RSTD/UE Rx-Tx time difference of an SSB to the UE), the UE may consider or assume that a received specific SSB (and/or specific SSB index) has been transmitted from a specific single cell/BS/TP. That is, for example, when an SSB is also used for the purpose of UE positioning, an SSB transmitted by each cell/BS/TP may be transmitted such that the SSB is multiplexed in time division multiplexing (TDM) on a cell/BS/TP basis, and this information may be configured/indicated for/to the UE by the BS and/or the LMF.

3.2.3. [Proposal #3] UE-Assisted Reference PRS Resource Configuration Based on SSB/CSI-RS Resource For example, OTDOA positioning is a UE positioning scheme based on the time difference between RSs transmitted from multiple cells/BSs/TPs, that is, based on RSTD values. The accuracy of the ToA/ToF/propagation time measurement value of an RS and/or an RS resource and/or an RS resource set as a reference for timing difference calculation may be very important to RSTD accuracy.

For example, when the BS and/or the LMF configures a PRS, and a reference cell/BS/TP and/or a reference PRS resource (and/or a reference PRS resource set) (e.g., a cell/BS/TP and/or a PRS resource (and/or a PRS resource set) serving as a reference for RSTD calculation) for the UE, it may be difficult (for the UE) to determine a cell/BS/TP that transmits a PRS with the best delay time measurement accuracy and/or quality and a direction in which the PRS is transmitted with the best delay time measurement accuracy and/or quality. To solve this problem, the following may be considered according to various embodiments of the present disclosure.

For example, the UE may request the BS/LMF/location server to use a specific SSB resource and/or CSI-RS resource configured/indicated for RSRP measurement/reporting (e.g., L1-RSRP and/or L3-RSRP measurement/reporting) as a "reference PRS resource", when the BS/LMF/location server configures a PRS. And/or, for example, the UE may request the BS/LMF/location server to allocate/configure a large number of time and/or frequency resources (e.g., time and/or frequency resources as many as or more than/more than a predetermined threshold) as PRS resources to be transmitted in the direction of a Tx beam carrying the SSB resource and/or the CSI-RS resource. For example, the BS/LMF/location server may regard this request of the UE as a request for a reference PRS resource.

For example, the reference PRS resource, which is a PRS resource serving as a reference for RSTD calculation, may refer to a PRS resource transmitted in a specific Tx beam direction from a reference cell/BS/TP. For example, the specific Tx beam direction (and/or the specific PRS resource) may have a largest RSRP measurement value (a Tx beam with the largest RSRP measurement value) and/or a shortest ToA/ToF/propagation time (a Tx beam with the shortest ToA/ToF/propagation time). For example, this may be configured/indicated for/to the UE by the BS and/or the LMF.

That is, for example, using a specific SSB resource and/or CSI-RS resource as a reference PRS resource may mean using a PRS resource transmitted in a Tx beam direction in which the SSB resource and/or CSI-RS resource has been transmitted as a PRS (and/or PRS resource) serving as a reference for timing difference calculation. For example, the BS and/or the LMF may configure/indicate information related to "using a specific SSB resource and/or a CSI-RS resource as a reference PRS resource" for/to the UE.

For example, it may be understood to those skilled in the art that an Rx beam that the UE uses to receive the SSB resource and/or the CSI-RS resource is in the QCL (e.g., QCL-type D) relationship with an Rx beam that the UE uses to receive the PRS resource. Further, for example, it may be understood to those skilled in the art that the change of the Tx beam(s) carrying the PRS is the change of the PRS resource. For example, one Tx beam may be mapped to a specific PRS resource. For example, the UE may identify a Tx beam in which a specific PRS resource is to be transmitted by the QCL configuration of the PRS resource (e.g., a QCL type-D configuration or the ID of a specific RS resource configured as a source of the PRS resource).

In this regard, for example, a UE request for transmission of a PRS resource on a Tx beam in which a corresponding SSB resource and/or CSI-RS resource has been transmitted may be a request for changing an SSB index configured with QCL(type-D) with the specific PRS resource to another SSB index (e.g., corresponding to a maximum RSRP).

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

3.3. Initial Network Access and Communication Process

A UE may perform a network access process to perform the described/proposed procedures and/or methods according to various embodiments of the present disclosure. For example, the UE may receive system information and configuration information required to perform the afore-described/proposed procedures and/or methods and store the received information in a memory, while accessing a network (e.g., a BS). The configuration information required for various embodiments of the present disclosure may be received by higher-layer signaling (e.g., RRC signaling or medium access control (MAC) signaling).

Figure 28:
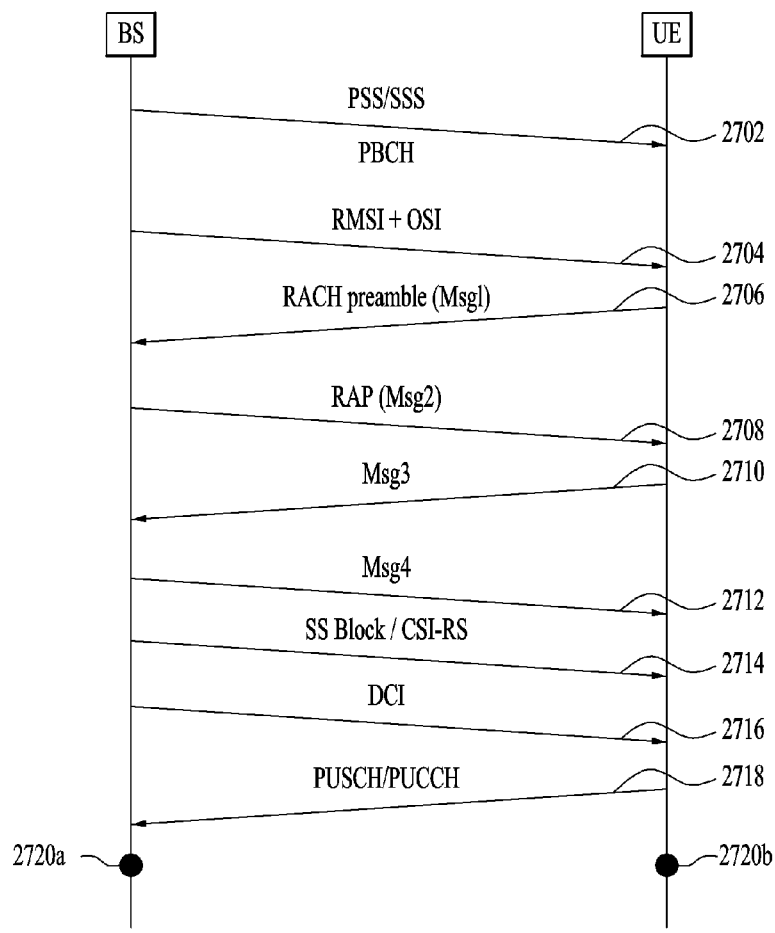
FIG. 28 is a simplified diagram illustrating an initial network access and subsequent communication process according to various embodiments of the present disclosure.

FIG. 28 is a diagram illustrating an exemplary initial network access and subsequent communication process according to various embodiments of the present disclosure. In an NR system to which various embodiments of the present disclosure are applicable, a physical channel and an RS may be transmitted by beamforming. When beamforming-based signal transmission is supported, a BM process may be performed for beam alignment between a BS and a UE. Further, a signal proposed in various embodiments of the present disclosure may be transmitted/received by beamforming. In RRC IDLE mode, beam alignment may be performed based on an SSB (or SS/PBCH block), whereas in RRC CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 28, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1 or Msg1) in a PRACH resource linked/corresponding to the index (i.e., beam) of the best SSB (2706). The beam direction of the RACH preamble is associated with the PRACH resource. Association between PRACH resources (and/or RACH preambles) and SSBs (SSB indexes) may be configured by system information (e.g., RMSI). Subsequently, as a part of an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Subsequently, the UE and the BS may perform the afore-described/proposed procedures and/or methods. For example, the UE and the BS may transmit a radio signal by processing information stored in a memory or may process a received radio signal and store the processed signal in the memory according to various embodiments of the present disclosure, based on configuration information obtained in the network access process (e.g., the system information acquisition process, the RRC connection process through an RACH, and so on). The radio signal may include at least one of a PDCCH, a PDSCH, or an RS on DL and at least one of a PUCCH, a PUSCH, or an SRS on UL.

It may be obviously understood to those skilled in the art that the above-described initial access process may be combined with the descriptions of clause 1 to clause 3 to constitute other various embodiments of the present disclosure.

Figure 29:
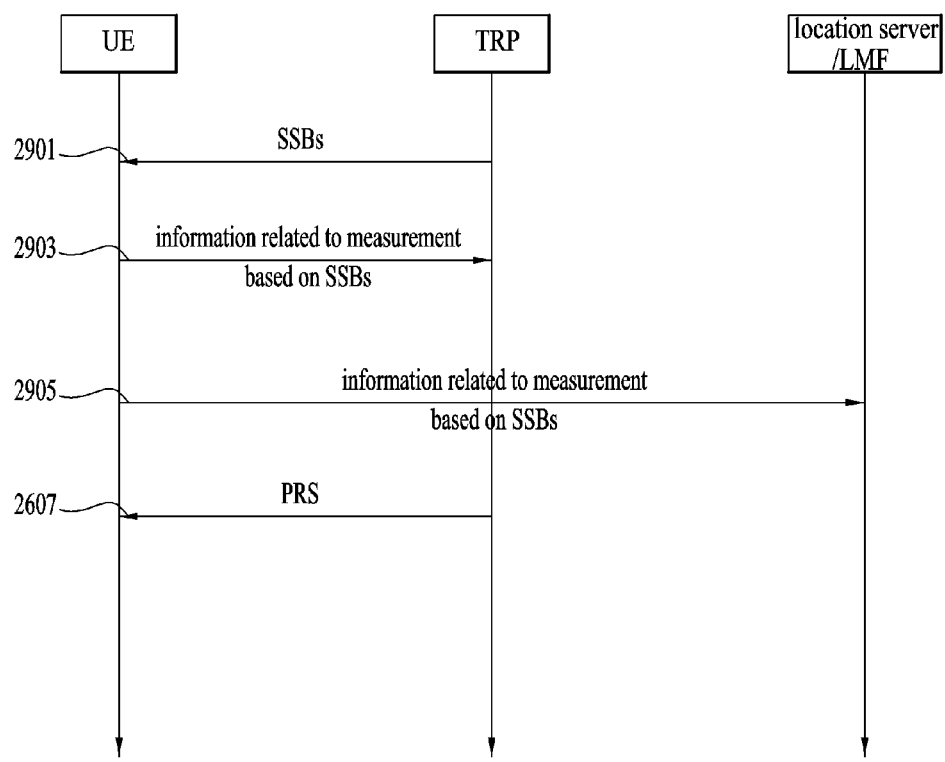
FIG. 29 is a simplified diagram illustrating a method of operating a UE and network nodes according to various embodiments of the present disclosure.

FIG. 29 is a simplified diagram illustrating a method of operating a UE and network nodes according to various embodiments of the present disclosure.

Referring to FIG. 29, a TP may transmit a plurality of SSBs, and a UE may receive the plurality of SSBs, in operation 2901 according to an exemplary embodiment.

In operations 2903 and 2905 according to an exemplary embodiment, the UE may transmit information related to measurements based on the plurality of SSBs, and the TP and/or a location server and/or an LMF may receive the information.

In operation 2907 according to an exemplary embodiment, the TP may transmit a PRS, and the UE may receive the PRS.

For example, the plurality of SSBs may be transmitted and received based on a plurality of beams directed in different beams.

For example, the PRS may be transmitted and received based on a beam directed in the same direction as a beam in which one of the plurality of SSBs has been received.

For example, the one SSB may be determined based on a predetermined condition related to measurement from among the plurality of SSBs.

For example, the above-described SSB may be replaced by a CSI-RS.

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary Configurations of Devices to which Various Embodiments of the Present Disclosure are Applied FIG. 30 is a diagram illustrating devices that implement various embodiments of the present disclosure.

Figure 30:
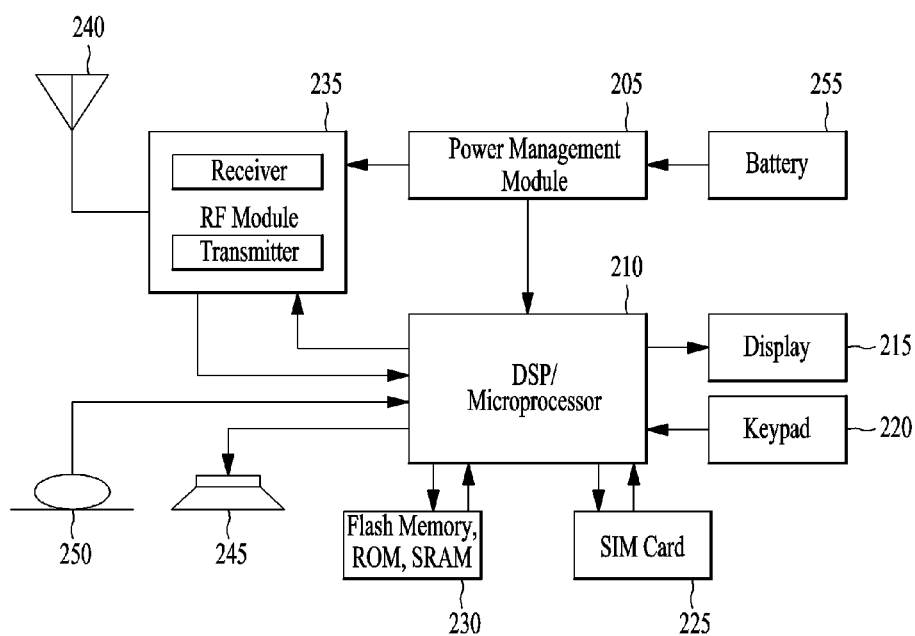
FIG. 30 is a diagram illustrating devices that implement various embodiments of the present disclosure.

The devices illustrated in FIG. 30 may be a UE and/or a BS (e.g., eNB or gNB) adapted to perform the afore-described mechanisms, or any devices performing the same operation.

Referring to FIG. 30, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, a FIG. 30 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Figure 32:
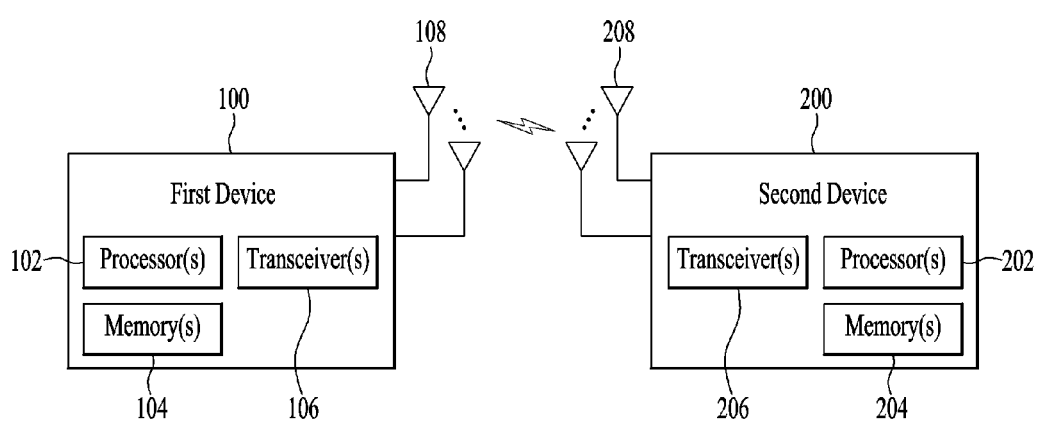
FIG. 32 illustrates exemplary wireless devices to which various embodiments of the present disclosure are applicable.

Further, FIG. 32 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, at least one processor included in a UE (or at least one processor of a communication device included in the UE) may receive a plurality of SSBs.

According to various embodiments of the present disclosure, the at least one processor included in the UE may transmit information related to measurements based on the plurality of SSBs.

According to various embodiments of the present disclosure, the at least one processor included in the UE may receive a PRS.

For example, the plurality of SSBs may be received based on a plurality of beams directed in different beams.

For example, the PRS may be received based on a beam directed in the same direction as a beam in which one of the plurality of SSBs has been received.

For example, the one SSB may be determined based on a predetermined condition related to measurement from among the plurality of SSBs.

For example, the above-described SSB may be replaced by a CSI-RS.

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 31:
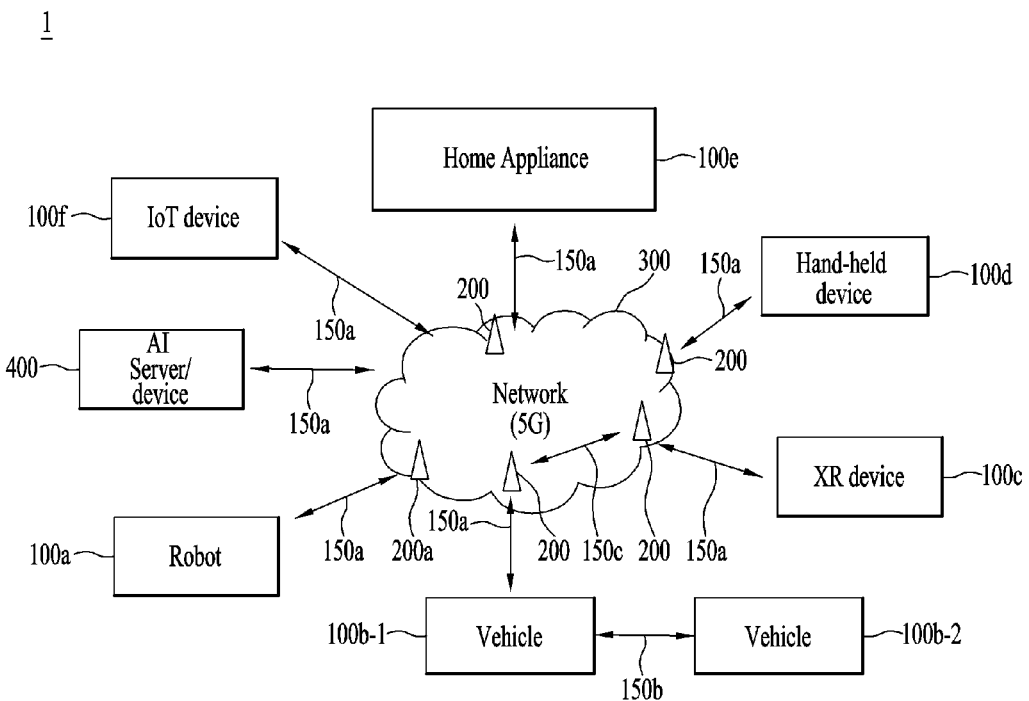
FIG. 31 illustrates an exemplary communication system to which various embodiments of the present disclosure are applied.

FIG. 31 illustrates an exemplary communication system to which various embodiments of the present disclosure are applied.

Referring to FIG. 31, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

4.2.1 Example of Wireless Devices to which Various Embodiments of the Present Disclosure are Applied FIG. 32 illustrates exemplary wireless devices to which various embodiments of the present disclosure are applicable.

Referring to FIG. 32, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 33:
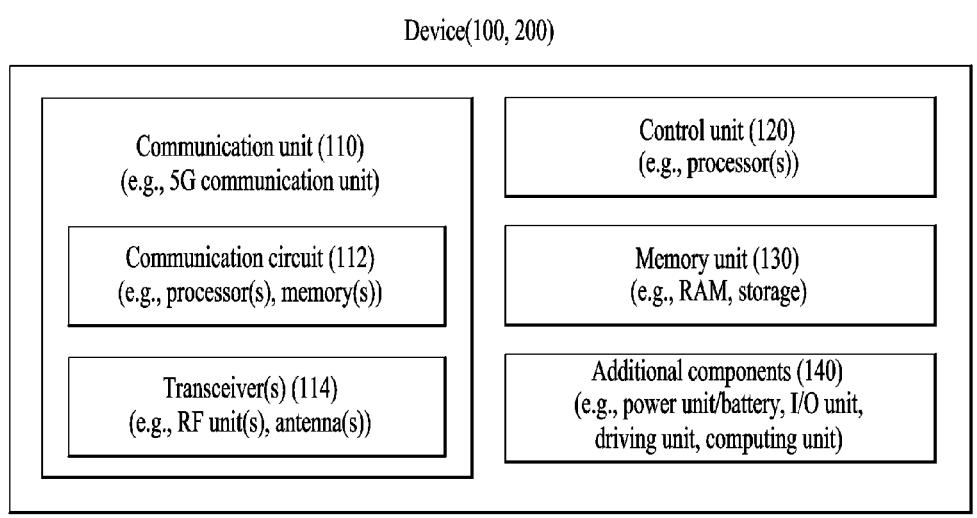
FIG. 33 illustrates other exemplary wireless devices to which various embodiments of the present disclosure are applied.

4.2.2. Example of Using Wireless Devices to which Various Embodiments of the Present Disclosure are Applied FIG. 33 illustrates other exemplary wireless devices to which various embodiments of the present disclosure are applied. The wireless devices may be implemented in various forms according to a use case/service (see FIG. 31).

Referring to FIG. 33, wireless devices 100 and 200 may correspond to the wireless devices 100 and 200 of FIG. 31 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 33, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 33 will be described in detail with reference to the drawings.

Figure 34:
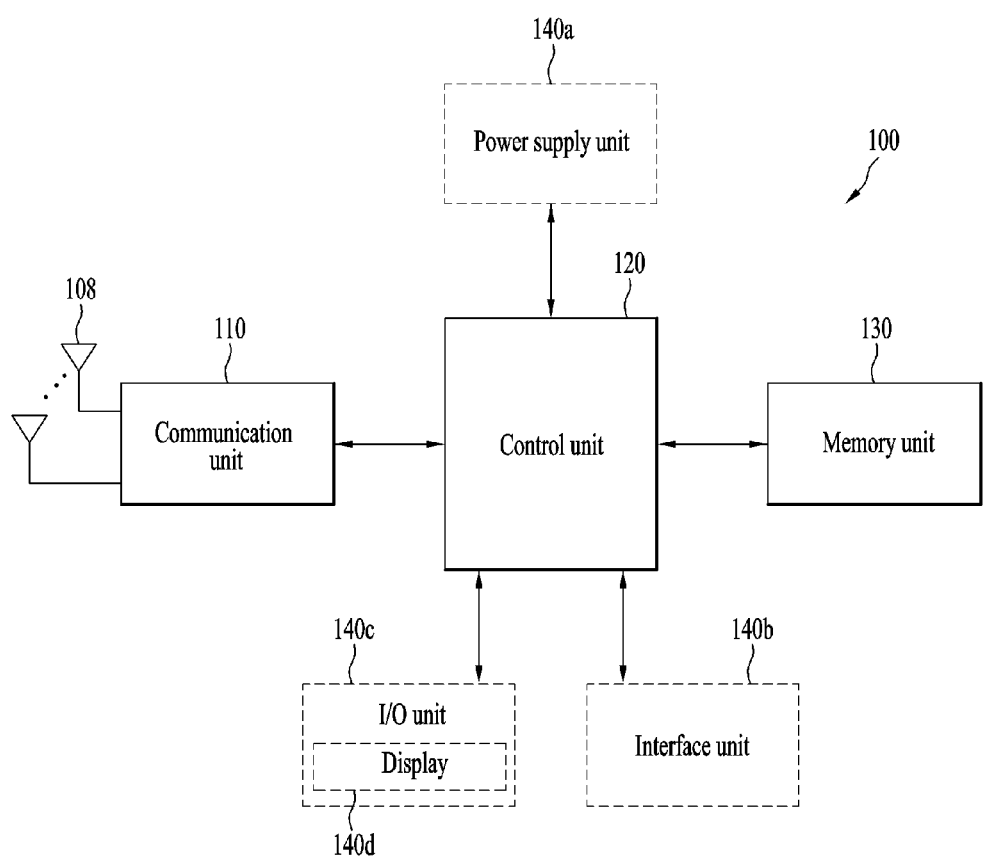
FIG. 34 illustrates an exemplary portable device to which various embodiments of the present disclosure are applied.

4.2.3. Example of Portable Device to which Various Embodiments of the Present Disclosure are Applied FIG. 34 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 34, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 35:
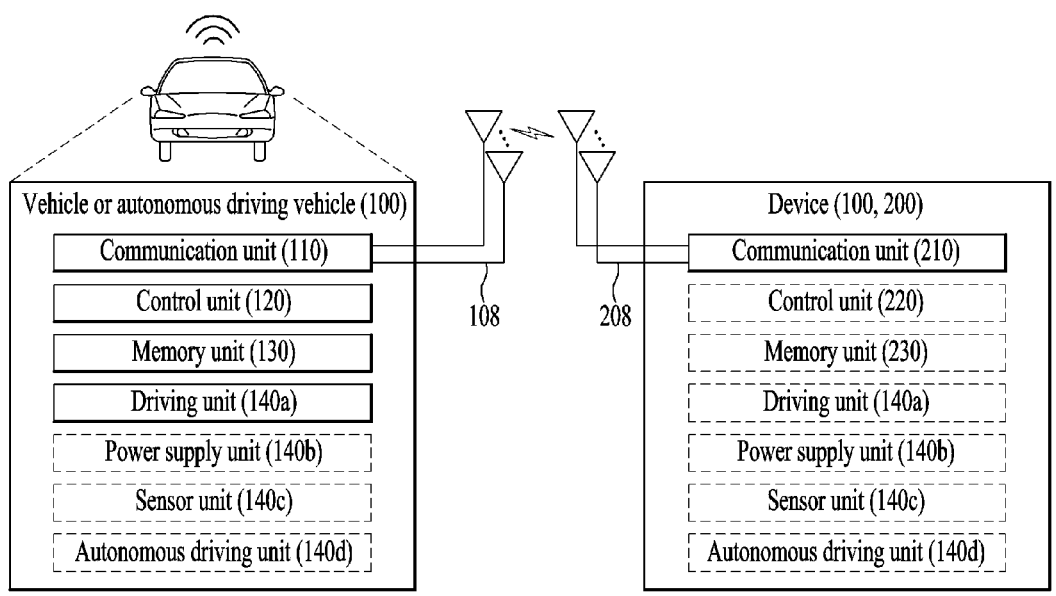
FIG. 35 illustrates an exemplary vehicle or autonomous driving vehicle to which various embodiments of the present disclosure.

4.2.4. Example of Vehicle or Autonomous Driving Vehicle to which Various Embodiments of the Present Disclosure FIG. 35 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 35, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 36:
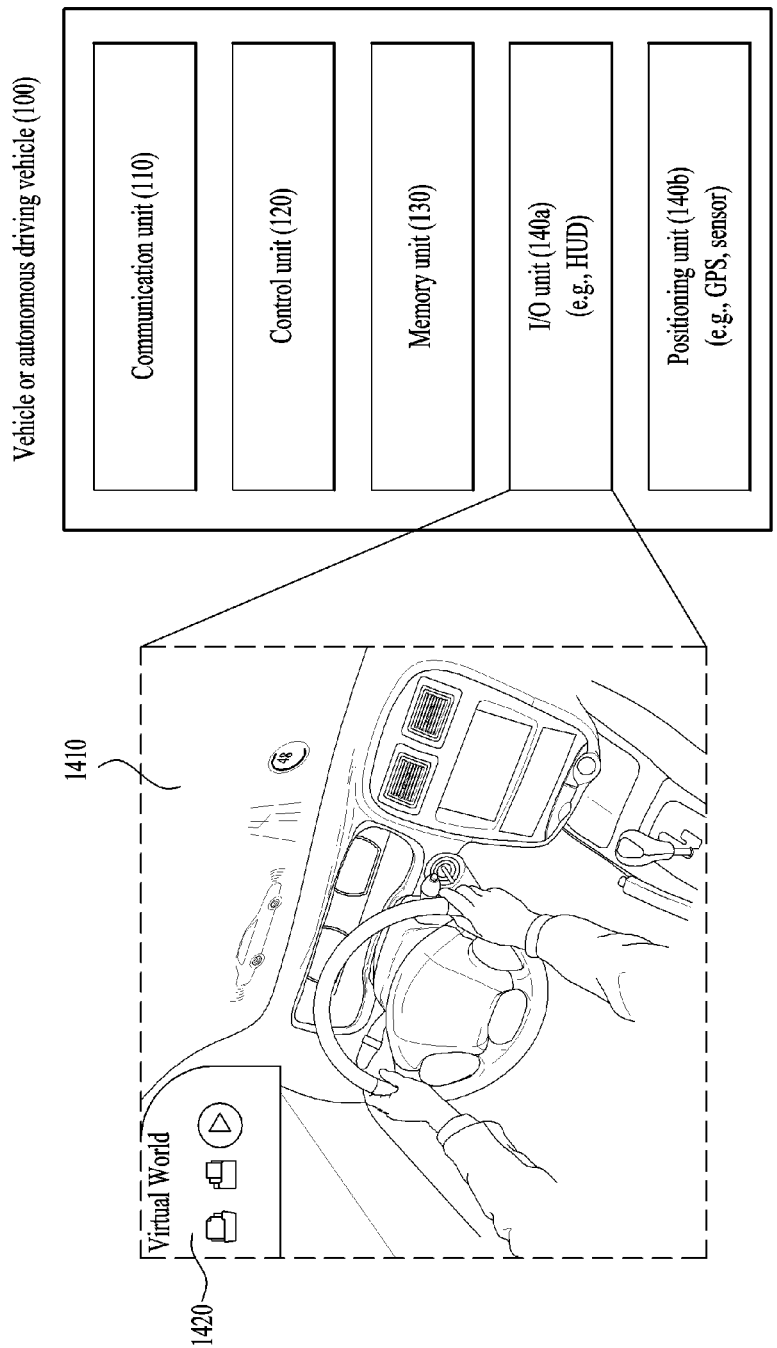
FIG. 36 illustrates an exemplary vehicle to which various embodiments of the present disclosure are applied.

4.2.5. Example of AR/VR and Vehicle to which Various Embodiments of the Present Disclosure FIG. 36 illustrates an exemplary vehicle to which various embodiments of the present disclosure are applied. The vehicle may be implemented as a transportation means, a train, an aircraft, a ship, or the like.

Referring to FIG. 36, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 33.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems. Examples of the various wireless access systems include a 3GPP system or a 3GPP2 system. Besides these wireless access systems, the various embodiments of the present disclosure are applicable to all technical fields in which the wireless access systems find their applications. Moreover, the proposed methods are also applicable to an mmWave communication system using an ultra-high frequency band.

What is claimed is:

1. A method performed by a user equipment (UE) in a wireless communication system, the method comprising:
   receiving a plurality of synchronization signal blocks (SSBs);
   performing measurements based on the plurality of SSBs;
   transmitting first request information related to positioning reference signal (PRS) transmissions based on the measurements;
   receiving a positioning related configuration based on transmitting the first request information; and
   receiving at least one PRS based on the positioning related configuration,
   wherein the plurality of SSBs are received based on a plurality of downlink beams directed in different directions,
   wherein the first request information includes information regarding a first SSB,
   wherein the first SSB is determined based on a predetermined condition related to the measurements from among the plurality of SSBs,
   wherein the positioning related configuration includes information related to a reference PRS resource for a reference timing for a reference signal time difference (RSTD), and
   wherein the reference PRS resource is related to a same downlink beam as that for the first SSB.

2. The method according to claim 1, wherein the first request information is related to requesting a change of an index of an SSB configured with quasi-colocation (QCL) type-D with the first PRS, and
   wherein the first SSB is determined to be an SSB with the changed index.

3. The method according to claim 1, wherein the predetermined condition related to the measurements comprises at least:
   (i) a first condition related to having a minimum of propagation times measured in the plurality of respective SSBs;
   (ii) a second condition related to having a minimum of time of arrivals (ToAs) measured in the plurality of respective SSBs;

(iii) a third condition related to having a minimum of time of flights (ToFs) measured in the plurality of respective SSBs; or
(iv) a fourth condition related to having a maximum of time of reference signal reception powers (RSRPs) measured in the plurality of respective SSBs.

4. The method according to claim 1,
wherein the at least one PRS comprises a first PRS and a second PRS, and
wherein the method further comprises:
transmitting information related to a RSTD value based on the reference timing, the first PRS, and the second PRS.

5. The method according to claim 4, wherein the first PRS and the second PRS are received from a plurality of transmission points (TPs), and
wherein the positioning related configuration further includes information related to a reference TP for the reference timing among the plurality of TPs.

6. A user equipment (UE) configured to operate in a wireless communication system, the UE comprising:
a transceiver;
at least one processor coupled to the transceiver; and
at least one memory storing instructions that cause the at least one processor to perform operations comprising:
receiving a plurality of synchronization signal blocks (SSBs);
performing measurements based on the plurality of SSBs;
transmitting first request information related to positioning reference signal (PRS) transmissions based on the measurements;
receiving a positioning related configuration based on the first request information; and
receiving at least one PRS based on the positioning related configuration,
wherein the plurality of SSBs are received based on a plurality of downlink beams directed in different directions,
wherein the first request information includes information regarding a first SSB,
wherein the first SSB is determined based on a predetermined condition related to the measurements from among the plurality of SSBs,
wherein the positioning related configuration includes information related to a reference PRS resource for a reference timing for a reference signal time difference (RSTD), and
wherein the reference PRS resource is related to a same downlink beam as that for the first SSB.

7. The UE according to claim 6, wherein the predetermined condition related to the measurements comprises at least:

(i) a first condition related to having a minimum of propagation times measured in the plurality of respective SSBs;
(ii) a second condition related to having a minimum of time of arrivals (ToAs) measured in the plurality of respective SSBs;
(iii) a third condition related to having a minimum of time of flights (ToFs) measured in the plurality of respective SSBs; or
(iv) a fourth condition related to having a maximum of time of reference signal reception powers (RSRPs) measured in the plurality of respective SSBs.

8. The UE according to claim 6,
wherein the at least one PRS comprises a first PRS and a second PRS, and
wherein the operations further comprise:
transmitting information related to a RSTD value based on the reference timing, the first PRS, and the second PRS.

9. The UE according to claim 6, wherein the operations further comprise communicating with at least one of another UE, a network, or an autonomous driving vehicle other than a vehicle comprising the UE.

10. A base station configured to operate in a wireless communication system, the base station comprising:
a transceiver;
at least one processor coupled to the transceiver; and
at least one memory storing instructions that cause the at least one processor to perform operations comprising:
transmitting a plurality of synchronization signal blocks (SSBs);
receiving first request information related to positioning reference signal (PRS) transmissions from a user equipment (UE);
transmitting a positioning related configuration to the UE based on the first request information; and
transmitting at least one PRS based on the positioning related configuration,
wherein the plurality of SSBs are transmitted based on a plurality of downlink beams directed in different directions,
wherein the first request information includes information regarding a first SSB,
wherein the positioning related configuration includes information related to a reference PRS resource for a reference timing for a reference signal time difference (RSTD), and
wherein the reference PRS resource is related to a same downlink beam as that for the first SSB.

* * * * *